(12) United States Patent
Haeberli

(10) Patent No.: US 7,395,229 B2
(45) Date of Patent: Jul. 1, 2008

(54) SYSTEM AND METHOD OF CHANGING ATTRIBUTES AN IMAGE-BASED PRODUCT

(75) Inventor: Paul Haeberli, San Francisco, CA (US)

(73) Assignee: Shutterfly, Inc., Redwood City, CA (US)

(*) Notice: Subject to any disclaimer, the term of this patent is extended or adjusted under 35 U.S.C. 154(b) by 264 days.

(21) Appl. No.: 11/351,715

(22) Filed: Feb. 10, 2006

(65) Prior Publication Data

US 2006/0155612 A1  Jul. 13, 2006

Related U.S. Application Data

(63) Continuation of application No. 09/560,222, filed on Apr. 28, 2000, now Pat. No. 7,016,869.

(51) Int. Cl.
*G06F 17/30* (2006.01)
(52) U.S. Cl. .......................................... 705/27; 705/26
(58) Field of Classification Search .................. 705/26, 705/27
See application file for complete search history.

(56) References Cited

U.S. PATENT DOCUMENTS

| | | | |
|---|---|---|---|
| 5,649,032 A | 7/1997 | Burt | |
| 5,974,401 A | 10/1999 | Enomoto | |
| 6,017,157 A | 1/2000 | Garfinkle et al. | |
| 6,064,397 A | 5/2000 | Herregods | |
| 6,069,637 A * | 5/2000 | Gaglione et al. | ............ 345/629 |
| 6,154,295 A | 11/2000 | Fredlund | |
| 6,288,719 B1 | 9/2001 | Squilla | |
| 6,298,197 B1 | 10/2001 | Wain | |
| 6,349,194 B1 | 2/2002 | Nozaki | |
| 6,362,900 B1 | 3/2002 | Squilla | |
| 6,388,732 B1 | 5/2002 | William | |
| 6,507,824 B1 | 1/2003 | Yon | |
| 6,570,640 B1 | 5/2003 | Garfinkle et al. | |
| 6,667,814 B1 | 12/2003 | Tillotson | |
| 6,721,802 B1 | 4/2004 | Wright | |
| 6,727,909 B1 | 4/2004 | Matsumura | |
| 2001/0013896 A1 * | 8/2001 | Anderson | .................... 348/239 |

OTHER PUBLICATIONS

Dunham, "eCircle.com and eframes.com make it possible to share, print, and frame holiday memories", dated Dec. 8, 1999.*
Paul Heckbert, "Color image optization for frame buffer display", Computer Graphics, vol. 16, No. 3, pp. 297-307, Jul. 1982.

* cited by examiner

*Primary Examiner*—Mark Fadok
(74) *Attorney, Agent, or Firm*—Xin Wen

(57) ABSTRACT

A system and method for changing attributes of an image-based product in which an attribute of a first image is automatically identified and a new value for a product attribute of the image-based product is automatically selected based on the image attribute. Also, a user interface can be provided that allows a user to actuate a user interface control in order to select a new value for a product attribute of an image-based product. Such techniques can be used to offer image-based products for sale over a computer network such as the Internet so that the user can change attributes of the image-based products before ordering.

22 Claims, 33 Drawing Sheets

SYSTEM AND METHOD OF CHANGING ATTRIBUTES AN IMAGE-BASED PRODUCT

This application is a Continuation of U.S. patent application Ser. No. 09/560,222, filed Apr. 28, 2000, and entitled "SYSTEM AND METHOD OF CHANGING ATTRIBUTES OF AN IMAGE-BASED PRODUCT".

TECHNICAL FIELD

This disclosure relates to a method and system of changing attributes of an image-based product.

BACKGROUND

Images can be generated in several ways. For example, an image can be captured using a film-based or digital camera and/or created and edited using image processing software such as ADOBE PHOTOSHOP® or the GNU IMAGE MANIPULATION PROGRAM ("GIMP"). Images captured using a film-based camera typically are stored as film negatives. Images captured using a digital camera typically are stored as digital files residing in the memory of the digital camera and/or a storage medium to which the file has been transferred (for example, a hard drive or CDROM). Images created using image processing software are typically stored as a digital file residing on a computer readable medium such as a hard drive.

An image-based product can be generated from such stored images. As used here, the term "image-based product" refers to an item, regardless of medium, that includes a visual representation of at least a portion of one or more images. One example of an image-based product is an image print (also commonly referred to as a "photograph"). For example, a user can take a picture using a conventional film-based camera and then bring the exposed film to a photo-finishing laboratory to have the laboratory develop the exposed film and generate an image print.

In addition to a visual representation of at least a portion of one or more images, an image-based product can include other components. One conventional type of image-based product is created by mounting an image print in a frame. For example a user can physically take an image print to a frame shop (i.e., to a "brick-and-mortar" frame shop) in order to select a frame (and other components such as a mat) in which to mount the image print. Such a user typically can seek assistance in selecting such components from an employee of the frame shop (referred to here as a "frame shop assistant"). The frame shop assistant can inspect the user's image print and select a mat and frame the assistant believes will look good with the image print. The user can then physically place the image print in or near the selected mat and frame in order to get an idea of how the image print would look mounted with the selected mat and frame. In this way, a user who has little training and experience in selecting an appropriate mat and frame can have a trained and experienced frame shop assistant select a mat and frame for the image print.

When a customer wishes to have a high-quality image print generated from a digital image, the customer need not physically take the digital image to a photo-finishing laboratory and instead can electronically transmit the digital image to an "online" photo-finishing laboratory using a computer network such as the Internet. For example, the customer can use an Internet browser program (referred to herein as a "browser") such as NETSCAPE NAVIGATOR®, which is commercially available from Netscape Communications Corporation of Mountain View, Calif., USA. The customer can direct the browser to a web site associated with the online photo-finishing laboratory and upload the digital image to a server hosting the web site. The online photo-finishing laboratory can then take the digital image from the web server and produce a high-quality image print from the digital image in a conventional manner. The online photo-finishing laboratory then typically sends the high-quality image print to the customer using a delivery service such as the UNITED STATES POSTAL SERVICE or FEDERAL EXPRESS®.

SUMMARY

Various implementations may include one or more of the following features.

In general, in one aspect, a method can include automatically identifying an attribute of a first image. The method also can include automatically selecting a new value for a product attribute of an image-based product based on the image attribute. The image-based product can incorporate at least a portion of the first image.

Advantageous implementations of the method include one or more of the following features. The method can also include receiving an order for the image-based product. Also, a first preview image of the image-based product can be generated and displayed. Displaying the first preview image can include downloading the first preview image to a client computer, and displaying the first preview image on the client computer.

Optionally, the method can also include receiving the first image. Receiving the first image can include uploading the first image (e.g., from a client computer to a server using a computer network such as the Internet), and/or storing the first image (e.g., in an image database). Also, receiving the first preview image can include receiving a plurality of images. A selection of the first image from the plurality of images can be received (e.g., after the plurality of images have been displayed).

Automatically identifying the image attribute can include analyzing the first image, and the new value for the product attribute can be automatically selected based on the analysis of the first image. Analyzing the first image can include generating a set of representative colors from the first image (e.g., by generating a color map for the first image, for example, by performing a median cut algorithm on the first image). Automatically selecting the new value for the product attribute can include selecting a color as a function of at least one of the representative colors. A color that matches at least one of the representative colors (e.g., a color that complements at least one of the representative colors) can be selected. Also, a color can be selected from the set of representative colors, for example, by selecting the most popular color from the set of representative colors or selecting a color at random from the set of representative colors. In one implementation, the product attribute can be a border color product attribute of the image-based product and the new value can be the selected color. In such an implementation, the method can further include generating a second preview image of the image-based product having a border. The color of the border can be the color specified by the border color product attribute.

Optionally, selecting a new value for the product attribute can include selecting the new value at random. Also, selecting a new value for the product attribute can include selecting the new value at psuedo-random. The selection of the new value can be constrained based on previous values of the product attribute. Also, selecting a new value for the product attribute can include selecting the new value from a predetermined ordering of values.

The product attribute can relate to which images are incorporated in the image-based product, and the image-based product can further incorporate at least a portion of a second image. In such a case, the method can further include receiving a plurality of images. An image attribute of each of the received images can be automatically identified, and the first and second images can be automatically selected from the received images based on the image attributes of the received images. The first and second images can be selected from a subset of the received images having similar image attributes. For example, the orientation of each of the received images can be determined, and the first and second images can be selected from a subset of the received images having a portrait orientation or from a subset of the received images having a landscape orientation. In such an implementation, the image-based product can be a diptych or a triptych.

The method can also include fulfilling the order for the image-based product. Also, the image-based product can be an image print or a framed image print, for example.

Optionally, the method can also include storing state information about the first image. The state information can be updated each time a new value for the product attribute is selected. The state information can include information about a current state of the product attribute and/or information about a past state of the product attribute. The information about the past state of the product attribute can include undo information for undoing the selection of the new value for the product attribute. In such an implementation, an undo command can be received, and the selection of the new value for the product attribute based on the undo information can be undone. Also, the information about the past state of the product attribute can include redo information for redoing the selection of the new value for the product attribute. In such an implementation, a redo command can be received, and the selection of the new value for the product attribute can be redone based on the redo information.

In another aspect, a server can include a web front end that connects the server to a computer network such as the Internet. The server can also include a print lab that is in communication with the web front end. The print lab can generate an image-based product incorporating a first image. The server can include software tangibly stored on a computer-readable medium. The software can include instructions operable to cause the server to receive a first image via the computer network, automatically identify an image attribute of the first image, and automatically select a new value for a product attribute of an image-based product. The new value can be selected based on the image attribute, and the image-based product can incorporate at least a portion of the first image. Optionally, the server can include an image database in communication with the web front end that stores the first image.

Advantageous implementations of the server include one or more of the following features. The software can also include instructions operable to cause the server to generate a first preview image of the image-based product, download the first preview image to a client computer, and display the first preview image on the client computer. Also, the software can include instructions operable to cause the server to receive the first image from a client computer connected to the server using the computer network such as the Internet.

Optionally, the software can include instructions operable to cause the server to receive a plurality of images and a selection of the first image from the plurality of images. For example, the images and/or selection can be received from a client computer connected to the computer network.

The software can also include instructions operable to cause the server to analyze the first image. The new value for the product attribute can be automatically selected based on the analysis of the first image. The software also can include instructions operable to cause the server to generate a set of representative colors from the first image (e.g., by including instructions operable to cause the server to generate a color map for the first image, for example, by performing the median cut algorithm on the first image).

Moreover, the software can include instructions operable to cause the server to select a color as a function of at least one of the representative colors. For example, such instructions can include instructions operable to cause the server to select a color that matches at least one of the representative colors, e.g., by including instruction operable to cause the server to select a color that complements at least one of the representative colors. Also such instructions can include instructions operable to cause the server to select the color from the set of representative colors, for example, by including instructions operable to cause the server to select the most popular color or to select the color at random from the set of representative colors. In such an implementation, the product attribute can be a border color product attribute of the image-based product, and the new value can be the selected color. Optionally, the software can include instructions operable to cause the server to generate a second preview image of the image-based product having a border. The color of the border can be the color specified by the border color product attribute.

The software further can include instructions operable to cause the server to select the new value at random, at psuedo-random, and/or from a predetermined ordering of values. The selection of the new value can be constrained based on previous values of the product attribute.

The product attribute can relate to which images are incorporated in the image-based product, and the image-based product can incorporate at least a portion of a second image. In such an implementation, the software can further include instructions operable to cause the server to receive a plurality of images, automatically identify an image attribute of each of the received images, and automatically select the first and second images from the received images based on the image attributes of the received images. The software can include instructions operable to cause the server to determine the orientation of each of the plurality of images. The first and second images can be selected from the subset of images having a portrait orientation or from the subset of images having a landscape orientation. The image-based product can be a diptych or a triptych.

Optionally, the software can further include instructions operable to cause the server to receive an order for the image-based product and fulfill the order for the image-based product. The image-based product can be, for example, an image print or a framed image print.

Also, the software can include instructions operable to cause the server to store state information about the first image. In such an implementation, the software can include instructions operable to cause the server to update the state information each time a new value for the product attribute is selected. The state information can include information about a current state of the product attribute and/or information about a past state of the product attribute. The information about the past state of the product attribute can include undo information for undoing the selection of the new value for the product attribute. For example, the software can include instructions operable to cause the server to receive an undo command and undo the selection of the new value for the product attribute based on the undo information. Also, the information about the past state of the product attribute can include redo information for redoing the selection of the new value for the product attribute. For example, the software can include instructions operable to cause the server to receive a redo command and redo the selection of the new value for the product attribute based on the redo information.

In another aspect, a method can provide a user on a client computer an interface for changing one or more product attributes of an image-based product that incorporates at least a portion of a first image. The client computer can be in communication with a server and can have a display and a pointing device operatively coupled to a cursor displayed on the display. Such a method can include displaying a border width control that, when actuated, supplies a new border size value to the server so that the server can change a border product attribute of the image-based product to the new border size value. Also, the method can include displaying a preview image of the image-based product.

Advantageous implementations of the method include one or more of the following features. The border width control can be a button associated with a minimum border size and/or can be part of web page that is downloaded by a browser executing on the client computer. Optionally, the method can further include displaying a print size control that, when actuated, supplies a new print size value to the server so that the server can change a print size product attribute of the image-based product to the new print size value. The print size control can be a selection box having a plurality of print size selections a user can select and/or can be part of web page that is downloaded by a browser executing on the client computer.

In another aspect, a method can provide a user on a client computer an interface for changing one or more product attributes of an image-based product that incorporates at least a portion of a first image. The client computer can be in communication with a server and can have a display and a pointing device operatively coupled to a cursor displayed on the display. Such a method can include displaying an image selection control that, when actuated, supplies an image selection to the server, the image selection identifying an image. Also, the method can include displaying a text entry control, e.g., a text entry field in which a user can enter text that, when actuated, supplies text to the server. The method can further include displaying a text position selection control including a plurality of versions of the image, each version of the image including at a least a portion of the text located in a different text position on the image. The text position selection control, when actuated, can supply to the server a text position selection that corresponds to one of the text positions.

Advantageous implementations of the method include one or more of the following features. The image selection control can be part of web page that is downloaded by a browser executing on the client computer. Such a web page can also include a plurality of thumbnail images so that the user can actuate the image selection control by clicking on a thumbnail image. The text entry control can be a text entry field in which a user can enter text and/or can be part of a web page that is downloaded by a browser executing on the client computer. Similarly, the text position selection control can be part of a web page that is downloaded by a browser executing on the client computer. Optionally, a user can actuate the text position selection control by clicking on one of the versions of the image.

Advantages that can be seen in implementations of the invention include one or more of the following. Generating and displaying a preview image of an image-based product allows a user to see how the image-based product will look with a particular set of product attributes. In this way, the user can determine if the user wishes to order such an image-based product and/or modify one or more of the attributes of that image-based product. For example, a preview image of an image print can be generated from an image selected by the user. The user can change one or more attributes of the image print, for example, the minimum border width, border style, border color, and print size.

Changing one or more attributes of an image-based product involves selecting which product attributes to change and then assigning a value to the selected attributes. Both of these operations can be performed manually by a user or automatically by a system. For example, a system can be configured to automatically select the one or more product attributes to change at random. In addition, or instead, the system can be configured to select one or more of the product attributes to change based on information relating to the user's images, past transactions, and account information. For example, the system can select one or more product attributes that the user's account information indicates the user has not tried changing (perhaps, because the user was unaware that the particular attribute could be changed). Also, the system can be configured to assign new values to the selected product attributes at random and/or based on information relating to the user's images, past transactions, and account information. In this way, the system can be configured to suggest new ways to incorporate a user's image in an image-based product.

For example, a system can be configured so as to allow the user to select one or more attributes to change and then have the system automatically assign values to the selected product attributes. The system can be configured to automatically assign the values to the selected product attributes as a function of a selected image. In one implementation, the system automatically selects a border color for an image print based on the colors contained in an image. In another implementation, the system can be configured to select multiple images to be included in an image-based product. In such an implementation, the product attribute assigned a new value is an attribute that indicates which images are to be included in the image-based product.

Moreover, the system can be configured to allow the user to both select which product attributes to change and assign a new value to the selected product attributes. For example, the system can be configured to present the user with an interface for cropping a selected image. In such an interface, a crop mask is displayed over the selected image. The system can generate the crop mask as a GIF image in which the portion of the crop mask corresponding to a selected portion of the image is transparent and the portion of the crop mask corresponding to a cropped portion of the image has a checkerboard pattern. By displaying the crop mask over the image, the selected portion of the image can be visually indicated. When a user changes the current selected portion of the image (for example, by actuating a control displayed on the client computer), the system generates a new crop mask based on the changes made by the user and displays the new crop mask over the image in order to visually indicate the new selected portion of the image.

Such an implementation is well suited for use with a browser-based system such as the World Wide Web. For example, the image and the crop mask can be displayed in an HTML table cell embedded in a web page. Because the system need only generate and download to the browser a new crop mask each time a user makes a change (as opposed to generating and downloading an entire image file), the system can display the changes made by the user relatively quickly.

In another implementation, the user can change product attributes relating to the border size, border style, border color, and/or print size of an image print. In yet another implementation, the user can specify the content and position of text to be incorporated in an image-based product.

Furthermore, a user interface control can be provided that the user can actuate in order to cause the system to automatically change one or more attributes of the image-based product. The system can be configured to change the attributes of the image-based product in a different way each time the control is actuated. Also, the appearance of the control can be changed each time the control is actuated in order to indicate to the user that actuating the control another time will cause the system to make different changes to the image-based product.

Moreover, state information can be automatically stored for each image, without requiring the user to issue an explicit "save" command. The state information can include information about the current product attributes associated with each image. For example, the stored state information can be updated each time the user changes the product attributes associated with an image. When the user later accesses that image (e.g., after the user performs some operation with another image and/or disconnects from the system), the stored state information can be retrieved and used as the current product attributes for the image. As a result, a preview image based on the retrieved state information can be generated and displayed for the user, and the user can resume manipulating the product attributes associated with the image starting from the point where the user was when the user last accessed the image.

The stored state information can also include information about past states of the product attributes associated with the image. The information about past states can include modification history that can be used to "undo" changes the user has previously made to the product attributes. Also, this modification history information can be used to allow the user to "redo" any changes that have been undone. For example, the user can make changes to product attributes associated with a first image. Then, the user can cease accessing that image and perform some other operation—for example, accessing and changing product attributes associated with a second image and/or disconnecting from the system. When the user subsequently accesses the image (e.g., several days later), the modification history information for that image can be retrieved and used to allow the user to undo or redo changes made while the user last accessed that image.

The details of one or more implementation of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
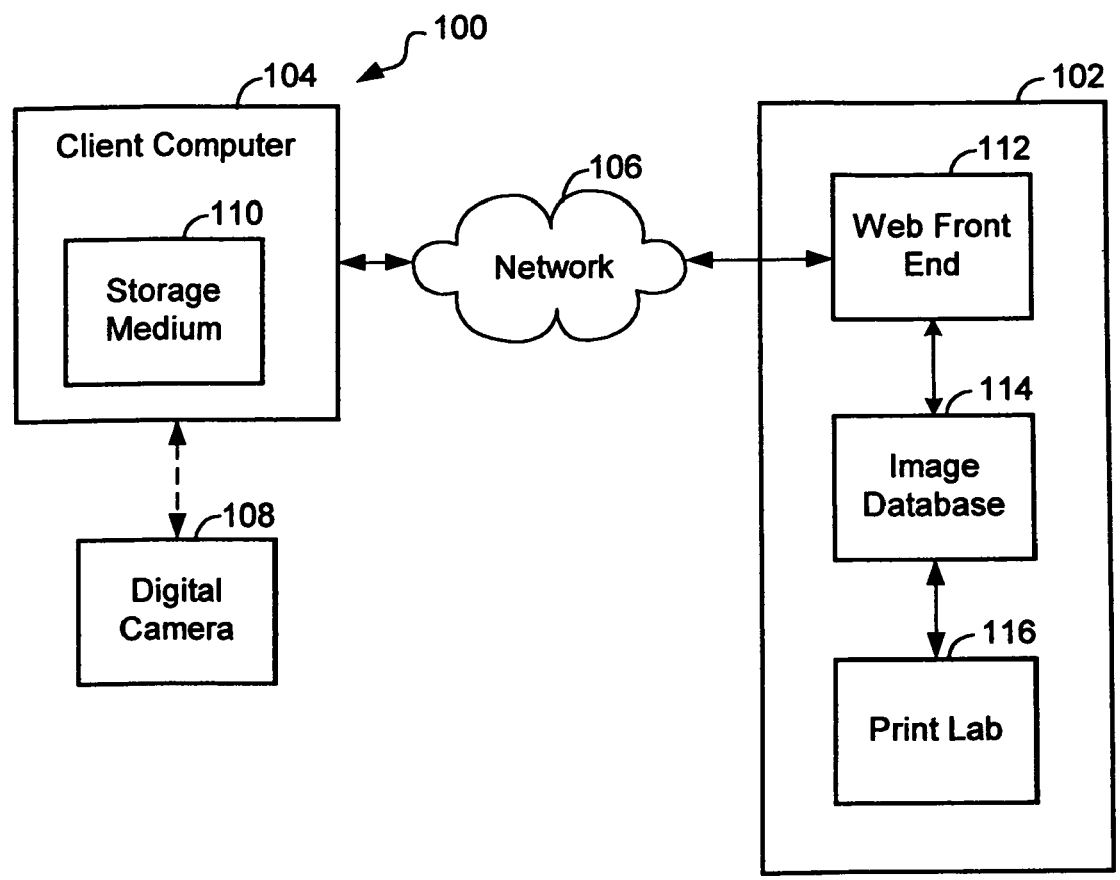
FIG. 1 is a block diagram of a system for generating image-based products from digital images.

One implementation of a system 100 for generating image-based products from digital images is shown in FIG. 1. System 100 includes a server 102 that is connected to one or more client computers 104 by a network 106 such as the Internet. The client computers 104 can be connected to a digital camera 108 so that a user can upload captured digital images from the digital camera 108 to the client computer 104. Alternatively, or in addition, the client computer 104 can execute image processing software such as ADOBE PHOTOSHOP® or the GIMP in order to create and/or edit digital images. The client computer 104 includes a storage medium 110 such as a hard disk for storing the digital images. The client computer 104 can be implemented using a variety of hardware and software. For example, the client computer 104 can be a general-purpose device such as a personal computer, portable computer, or portable digital assistant ("PDA") or as a special-purpose device such as a point-of-sale kiosk having an embedded computer.

The client computer 104 is connected to the network 106, for example, using a modem or network interface card. The system 100 can be implemented as a browser-based system in accordance with the standard protocols for communicating over the Word Wide Web. In such an implementation, a user of the client computer 104 can execute a browser to connect to and interact with the server 102. The server 102 includes a web front end 112 that manages the communications with the client computer 104. The user of the client computer 104 can upload digital images to the server 102. The web front end 112 receives the uploaded digital images and stores them in an image database 114.

The user of the client computer 104 can also order image prints made from selected images. The server 102 includes, or is connected to, a print lab 116. The print lab 116 receives the selected images from the server 102 and generates image prints from the selected images. The print lab 116 can generate other image-based products. For example, the print lab 116 can frame image prints in one or more frames selected by the user and/or print or otherwise embody the selected images in other items such as clothing, buttons, mugs, cards, invitations, and calendars. The items generated by the print lab 116 can be shipped to the user using a conventional shipping service such as the UNITED STATES POSTAL SERVICE or FEDERAL EXPRESS®. Commonly assigned co-pending U.S. patent applications Ser. No. 09/428,871 (entitled "MULTI-TIERED IMAGE DATABASE" and filed Oct. 27, 1999), Ser. No. 09/436,704 (entitled "DISTRIBUTING IMAGES TO MULTIPLE RECIPIENTS" and filed Nov. 9, 1999), and Ser. No. 09/450,075 (entitled "PRINTING IMAGES IN AN OPTIMIZED MANNER" and filed Nov. 29, 1999), all of which are incorporated herein by reference, disclose various approaches to implementing a system 100 for generating image-based products from digital images.

Figure 2:
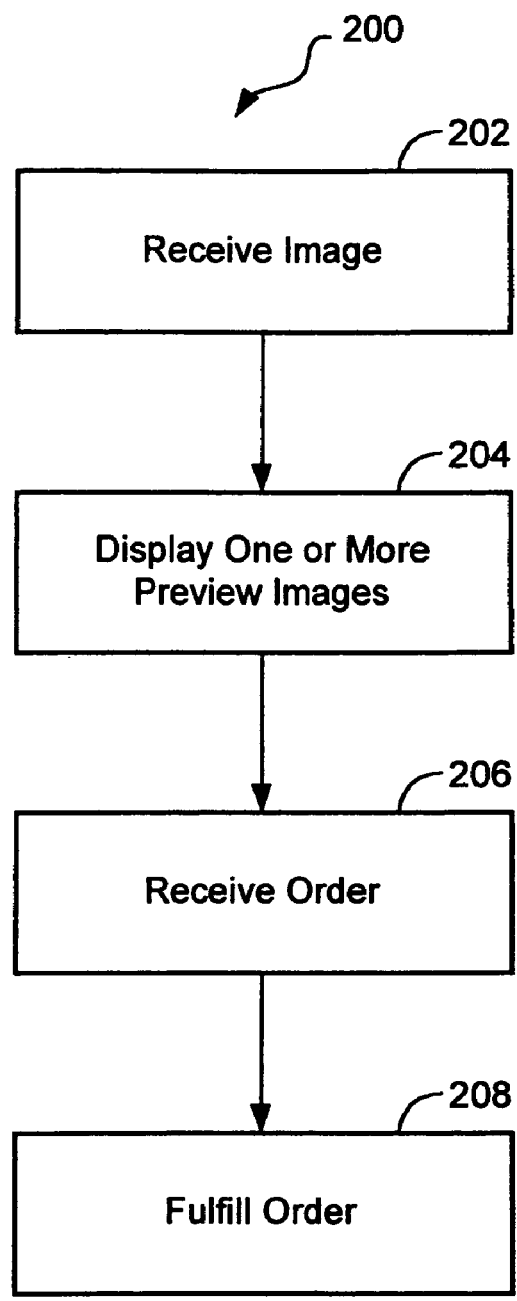
FIG. 2 is a flow diagram of a process for offering image-based products for sale over a computer network.

FIG. 2 is a flow diagram of a high-level process 200 for offering image-based products for sale over a computer network such as the Internet (e.g., using system 100 shown in FIG. 1). First, an image is received (block 202). For example, a user executing a browser on the client computer 104 can access the web front end 112 of the server 102 and upload a digital image to the server 102. The server 102 receives the uploaded image, which the user can select for subsequent processing as described below.

Figure 18:
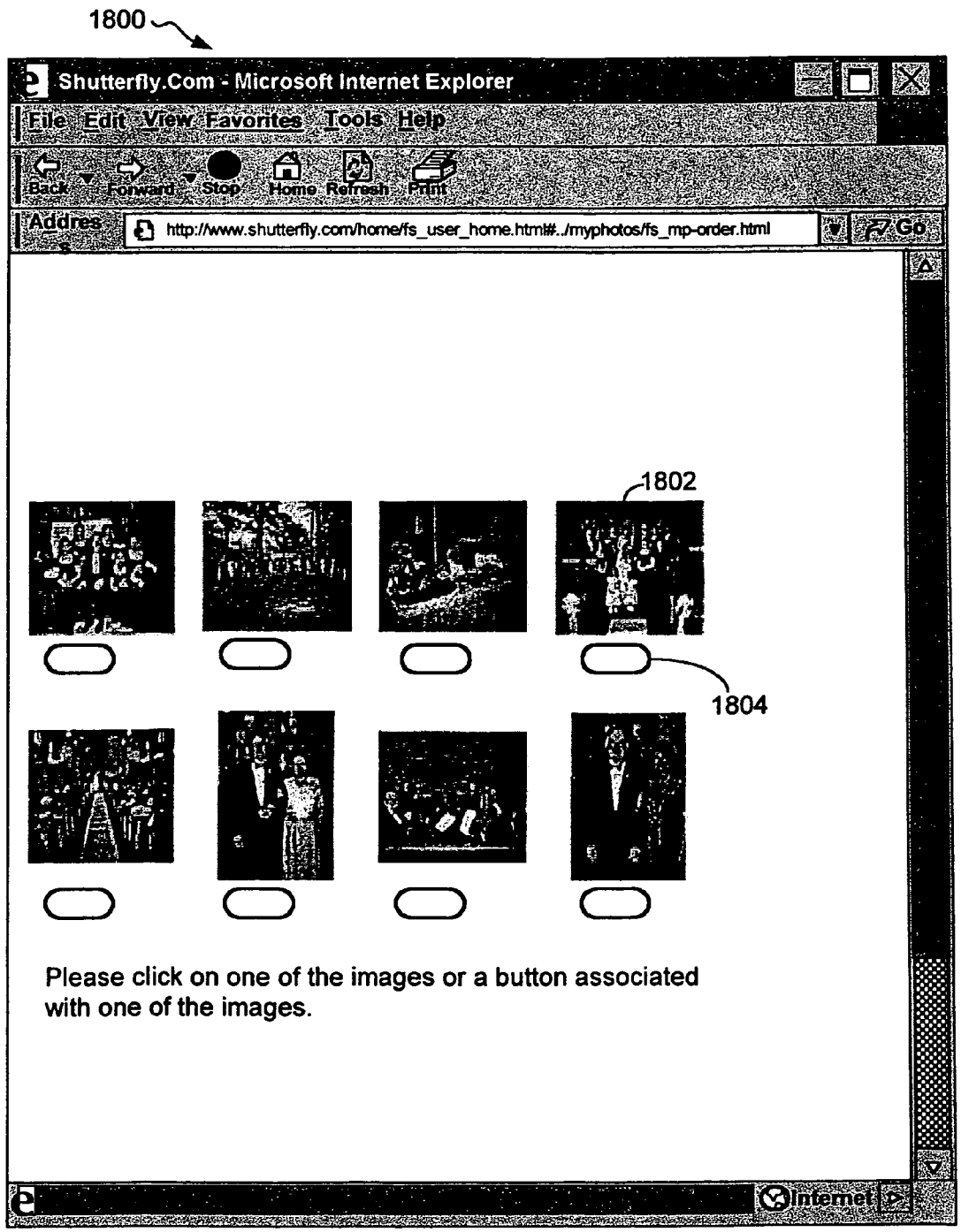
FIG. 18 shows a user interface that can be used to allow a user to select an image for subsequent processing.

Also, the uploaded image can be stored in the image database 114; thereafter, the image can be received from the image database 114. The web front end 112 can be configured to allow the user to view images stored in the image database 114 on the client computer 104 and select an image for subsequent processing. FIG. 18 shows one example of a user interface 1800 that can be used to allow a user to select an image for subsequent processing. A plurality of "thumbnail" versions 1802 of images stored in the image database 114 (also referred to here as "thumbnails") are displayed in the user interface 1800. The user interface 1800 can be configured in a conventional manner so that a user can select a particular image by clicking on the thumbnail 1802 associated with that image. In addition, or instead, the user interface 1800 can include a plurality of buttons 1804 (or other user interface controls) associated with one or more images stored in the image database 114; a user can click on (or otherwise actuate) one of the buttons 1804 in order to select the one or more images associated with that button 1804. The selected image is then retrieved from the image database 114 and used for subsequent processing. The image can be received and selected in other ways, including for example, as an attachment to an email or embodied on a storage medium such as photograph, a flash memory card or CD-ROM.

Then, one or more preview images for an image based product incorporating the selected image are displayed (block 204 shown in FIG. 2). As noted above, an image-based product is an item, regardless of medium, that includes a visual representation of at least a portion of one or more images. Examples of image-based products include image prints, buttons, posters, mugs, clothing, and cards in which at least a portion of one or more images is printed or otherwise incorporated or embodied. A preview image is a visual representation of an image-based product incorporating the selected image. The preview image is displayed in order to give the user an idea of what an image-based product incorporating the selected image will look like.

Next, an order is received for an image-based product incorporating the selected image (block 206). For example, the order can be received by the web front end 112 from the user's client computer 104. The order can be received in other ways including, for example, via electronic mail, Internet Relay Chat, the telephone, and/or the mail. Typically, the order will include information specifying (or otherwise referring or pointing to) a type of image-based product, the image to incorporate into the image-based product, a quantity of the image-based product being ordered, payment information, and delivery information. After the order has been received, the order is fulfilled (block 208). For example, the order can be fulfilled by printing or otherwise generating the image-based product and delivering the product to the customer.

Figure 3:
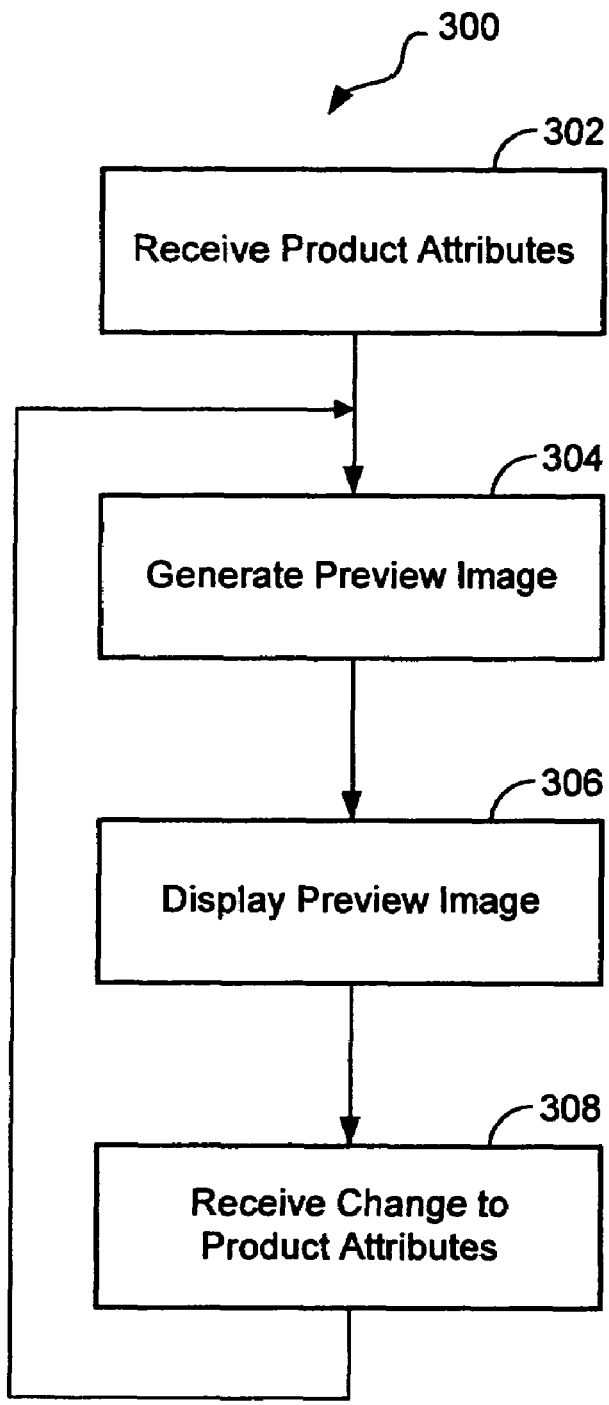
FIG. 3 is a flow diagram of a process for displaying preview images of an image-based product.

FIG. 3 is a flow diagram of a high-level process 300 of displaying preview images of an image-based product. A set of attributes for the image-based product (also referred to here as "product attributes") is received (block 302). In the case of an image print, the product attributes can include, for example, the size of the image print, the number and identity of the images included in the image print, cropping information, and the size, style, and color of any border surrounding the image portion of the image print. The set of attributes can be received from the user, for example, by having the user enter or select attributes using a browser executing on the client computer 104. Also, the set of attributes can be retrieved from storage, for example, from a database, or otherwise provided.

Then, a preview image is generated using the current set of product attributes for that image-based product (block 304). In the case of an image print, a preview image can be generated that shows an image print incorporating the portions of the images specified in the product attributes. The preview image can show any other feature specified in the product attributes. For example, the preview image can be scaled to the specified image print size and include the specified border size and style.

The preview image is then displayed (block 306). For example, the preview image can be generated by the web front end 112 and downloaded to, and displayed on, the client computer 104. Next, any changes to the product attributes can be received (308). After viewing the displayed preview image, the user may wish to change one or more of the product attributes. In one implementation, the user can makes such changes to the product attributes using a browser executing on the client computer 104. The changes can then be transmitted to the web front end 112, which updates the product attributes for the currently displayed image-based product. Process 300 then loops back to block 304 and generates and displays a new preview image and receives any further changes to the product attributes.

Figure 20:
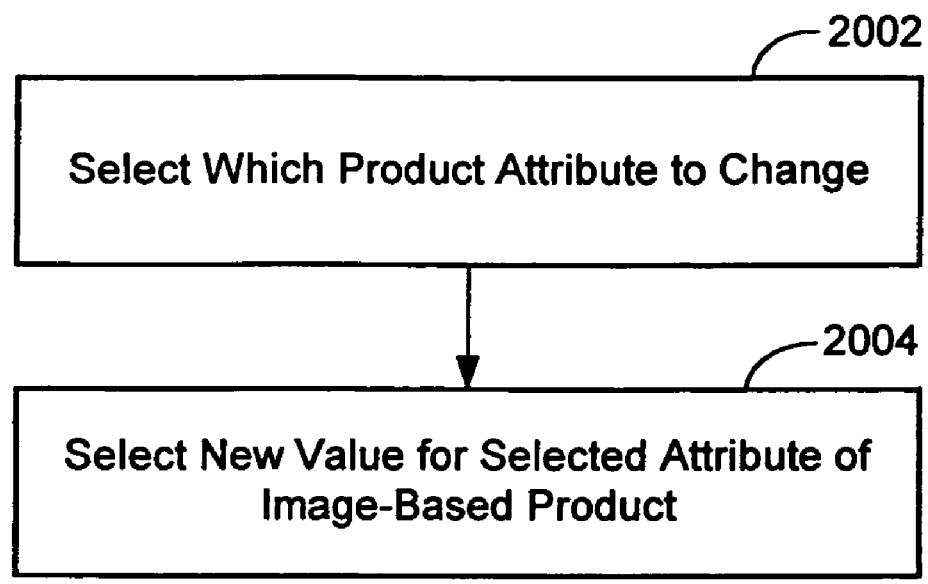
FIG. 20 is flow diagram of an operation that changes one or more product attributes.

As shown in FIG. 20, changing one or more attributes of an image-based product involves selecting which product attributes to change (block 2002) and then selecting a new value for the selected attributes (block 2004). Both of these operations can be performed manually by a user (e.g., where the user actuates one or more controls in order to select which product attributes to change and/or to select a new value for the selected attributes) or automatically by the system 100 (e.g., where the system 100 is commanded by the user or otherwise to select which product attributes to change and/or to select a new value for the selected attributes). For example, the system 100 can automatically select the one or more product attributes to change at random. In addition, or instead, the system 100 can automatically select one or more of the product attributes to change based on information relating to the user's images, past transactions, and account information. For example, the system 100 can select one or more product attributes that the user's account information indicates the user has not tried changing (perhaps, because the user was unaware that the particular attribute could be changed). Also, the system 100 can select new values for the selected product attributes at random and/or based on information relating to the user's images, past transactions, and account information. In this way, the system 100 suggests new ways to incorporate a user's image in an image-based product. The automatic selection of which product attributes to change and the automatic selection of a new value for the selected attributes can be performed by any component of the system 100 (e.g., by the server 102 and/or the client computer 104).

Figure 4:
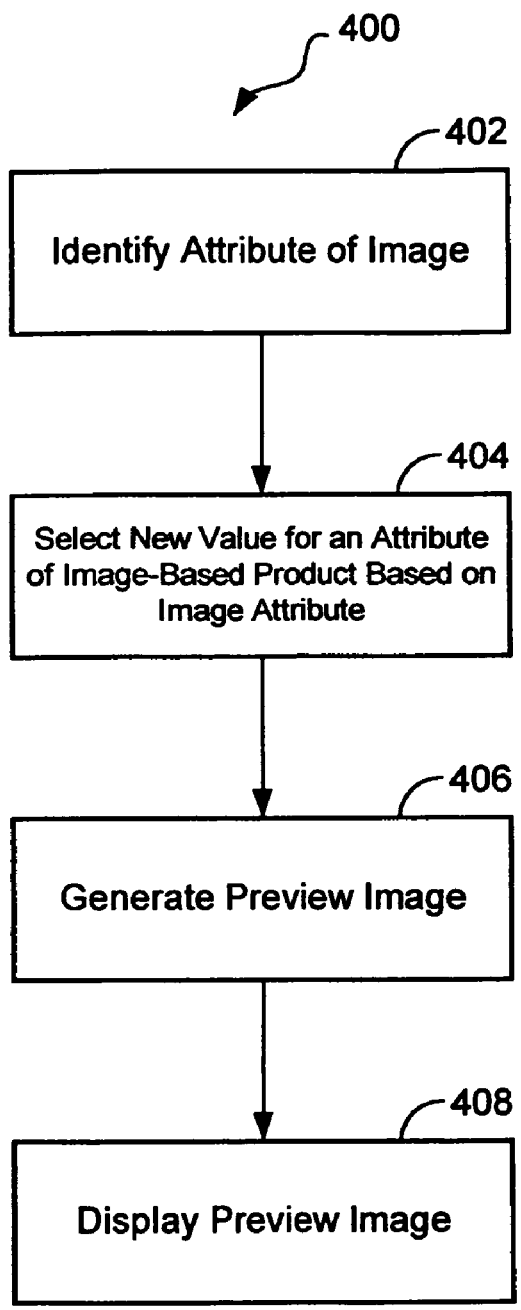
FIG. 4 is a flow diagram of a process for automatically assigning a value to a product attribute.

In one implementation, the user selects one or more product attributes to change and the system 100 automatically selects new values for the selected product attributes as a function of a selected image. FIG. 4 is a flow diagram of a process 400 of automatically selecting new values for the selected product attributes as function of an image. Process 400 includes identifying an attribute of the selected image (block 402). The attribute of the selected image (also referred to here as the "image attribute") can relate to any aspect of the image including, for example, when and how the image was captured, the colors, shapes, and patterns contained in the image, the resolution of the image, the format in which the image is stored, and the aspect ratio of the image.

Process 400 further includes selecting a new value for a product attribute for an image-based product based on the identified image attribute (block 404). In the case of an image print, the product attribute can be the color of a border that surrounds the image portion of the image print. Other examples of selecting a new value for a product attribute based on an identified image attribute include selecting which image or images (or portions thereof) to include in the image print or other image-based product (such as a framed image display). Then, a preview image can be generated (block 406) and displayed (block 408). After reviewing the preview image, the user can then make additional changes to the product attributes (e.g., by repeating process 400 for a different product attribute) and/or place an order for the displayed image-based product.

Figure 5:
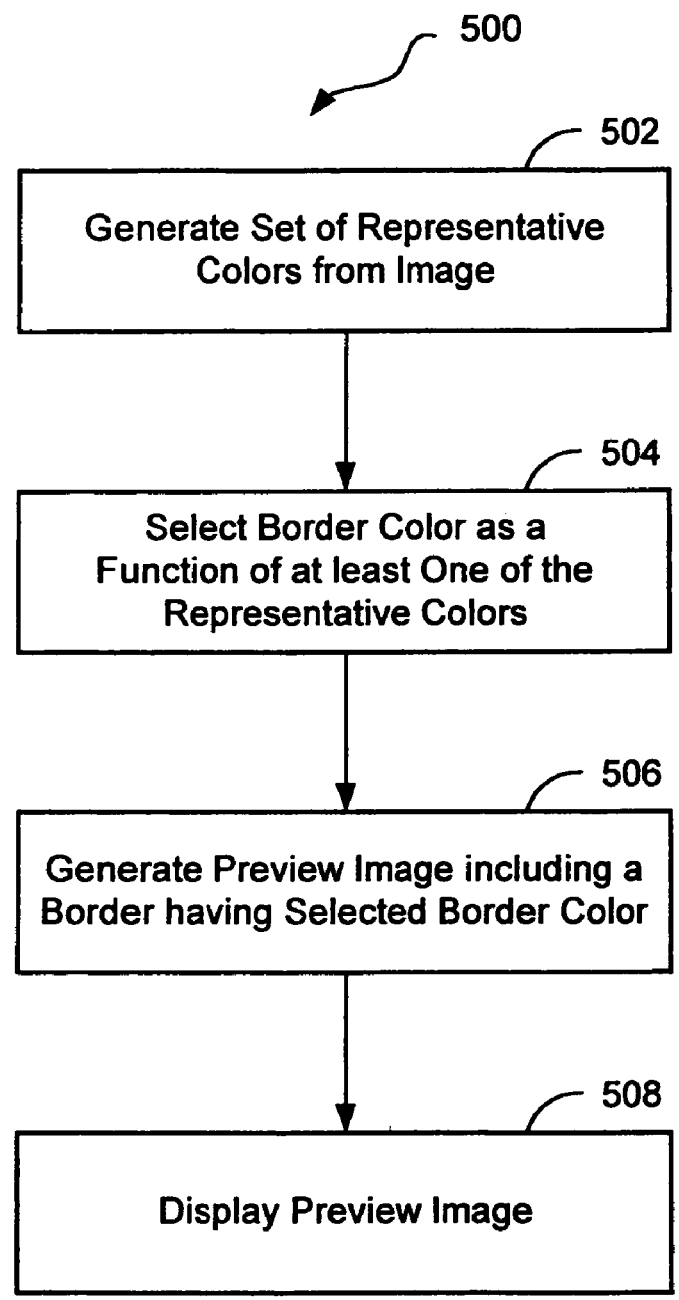
FIG. 5 is a flow diagram of a process for automatically selecting a border color for an image print based on the colors contained in a selected image.

In one implementation of process 400, a border color (also referred to as a "mat") for an image print is automatically selected. FIG. 5 is a flow diagram of a process 500 of automatically selecting a border color for an image print based on the colors contained in a selected image. After an image has been selected, a set of representative colors for the selected image is generated (block 502). For example, a set of representative colors for the selected image can be generated by applying a color mapping algorithm to the selected image. A suitable color mapping algorithm is the median cut algorithm, described in Paul Heckbert, "Color Image Quantization for Frame Buffer Display," ACM, Computer Graphics, pages 297-304, 1982.

A border color is then selected as a function of at least one of the representative colors (block 504). In one approach, the border color is selected from the set of representative colors. For example, the border color can be selected based on popularity. The representative colors in the set can be sorted according how many pixels in the selected image correspond to each color in the set. Then, the color in the set that is associated with the most pixels (that is, the most popular representative color) is selected as the border color. Other approaches to selecting the border color from the set of representative colors can be used. For example, a border color that "matches" one of the representative colors (e.g., the complement of the most popular) can be selected. Other examples include selecting the border color at random (or pseudo-random) from the set of representative colors. Such a random selection of the border color can be constrained based on the previous border color selections for that image (the previous selections for an attribute are referred to here as the attribute's "history"). For example, any previously selected border colors can be removed from the set of representative colors from which the random selection is made. Moreover, the border color can be selected from a predetermined border color order. The border color order can specify which colors are to be selected on successive automatic selections (e.g., selecting first the most popular representative color, then the complement of the most representative color, then the second most popular representative color, then the complement of the second most representative color, and so on).

A preview image is generated in which the selected image is surrounded by a border having the selected border color (block 506) and displayed (block 508). For example, the server 102 can generate a preview image having a border with the selected border color and download the preview image to the client computer 104. A browser executing on the client computer 104 can then display the preview image for the user to view. As described above, the user can then make additional changes to the product attributes and/or place an order for the displayed image-based product.

In alternative implementations of process 400 in which a border color is automatically selected for an image-based product, a color in the image can be identified without first generating a set of representative colors. In such an implementation, the border color can be selected as a function of the identified image. For example, the border color can be set to the identified color or to a color that matches the identified color.

Figure 6A:
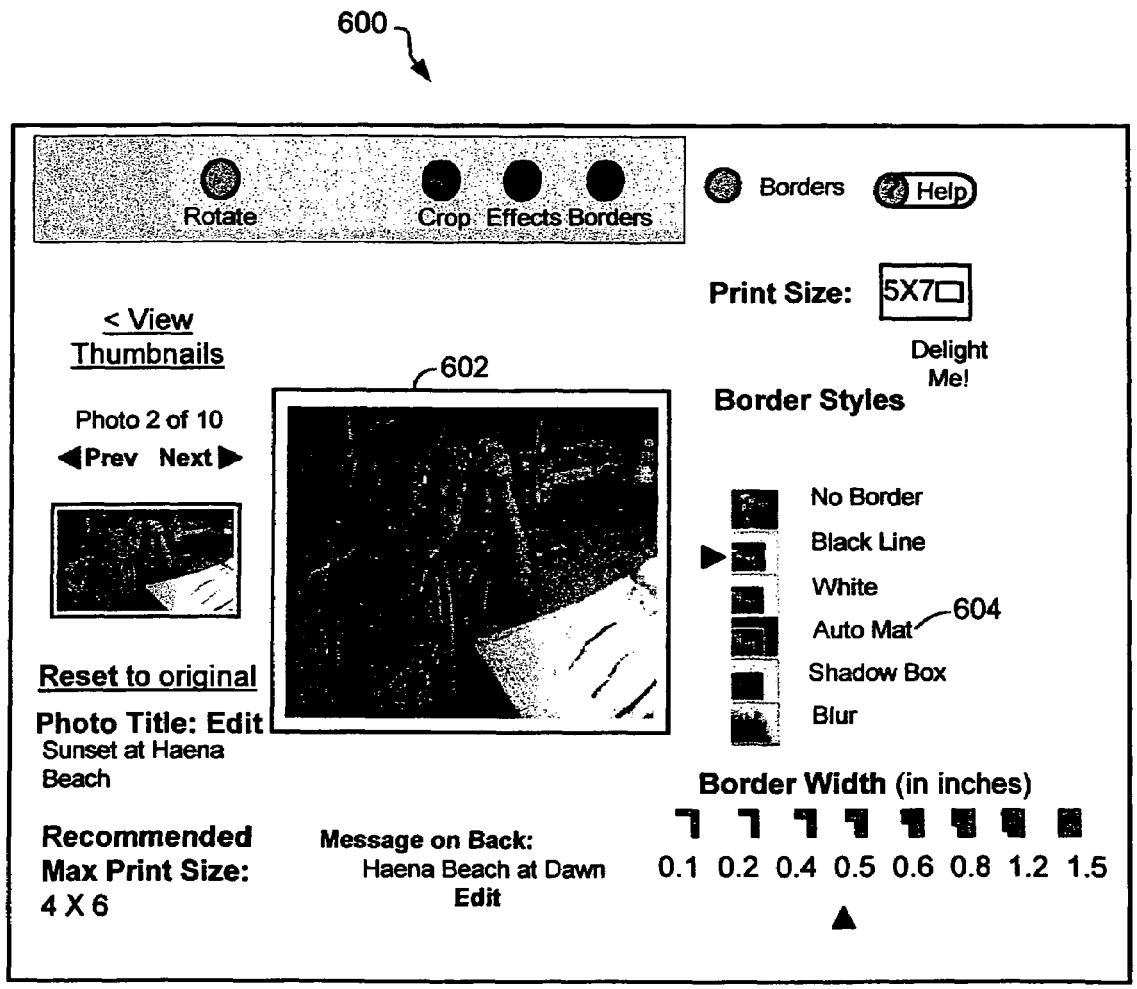
FIGS. 6A-6B show a user interface that can be used to implement the process shown in FIG. 5.
Figure 6B:
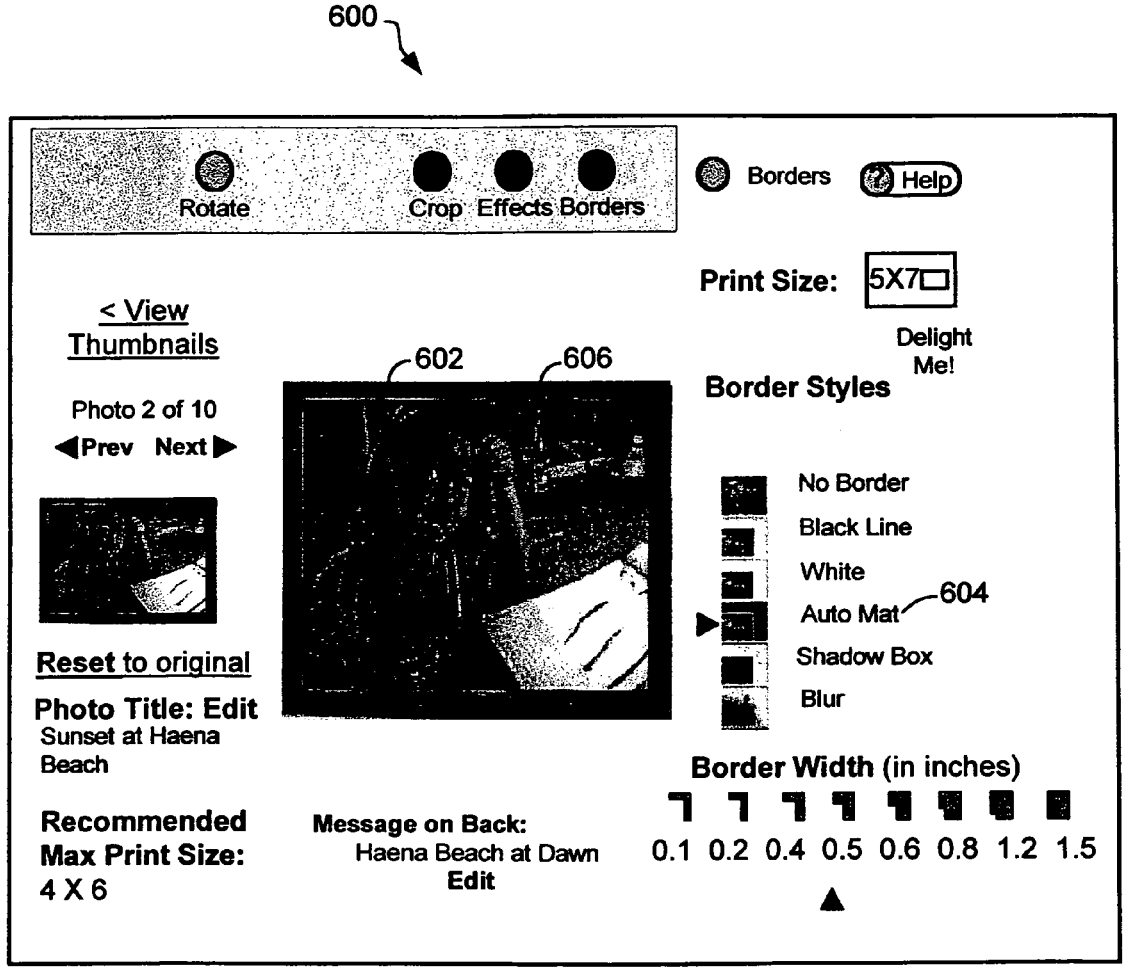

FIGS. 6A-6B show an example of a user interface 600 that can be used to implement process 500. As shown in FIG. 6A, after the user has selected an image for processing (for example, after the image has been uploaded to the server 102 and/or retrieved from the image database 114), preview image 602 of an image print incorporating the selected image is displayed in the user interface 600. A user can cause the server 102 to automatically select a border color for the image print by clicking on an "Auto Mat" button 604. In other words, the user selects an attribute of the image print to change (i.e., the border color product attribute) and causes the system to automatically select a new value (color) for the border color product attribute. After clicking on the "Auto Mat" button 604, the server 102 generates a set of representative colors and selects one of the representative colors as the border color for the image. Next, as shown in FIG. 6B, the image 602 is displayed in the user interface 600 surrounded by a border

606 having the selected border color. Such a user interface 600 need not provide additional screens and/or controls for allowing the user to select a particular color for the border color product attribute. Instead, the user interface 600 allows the user to request that the system select a border color for the image 602 by simply clicking a button 604.

Figure 7:
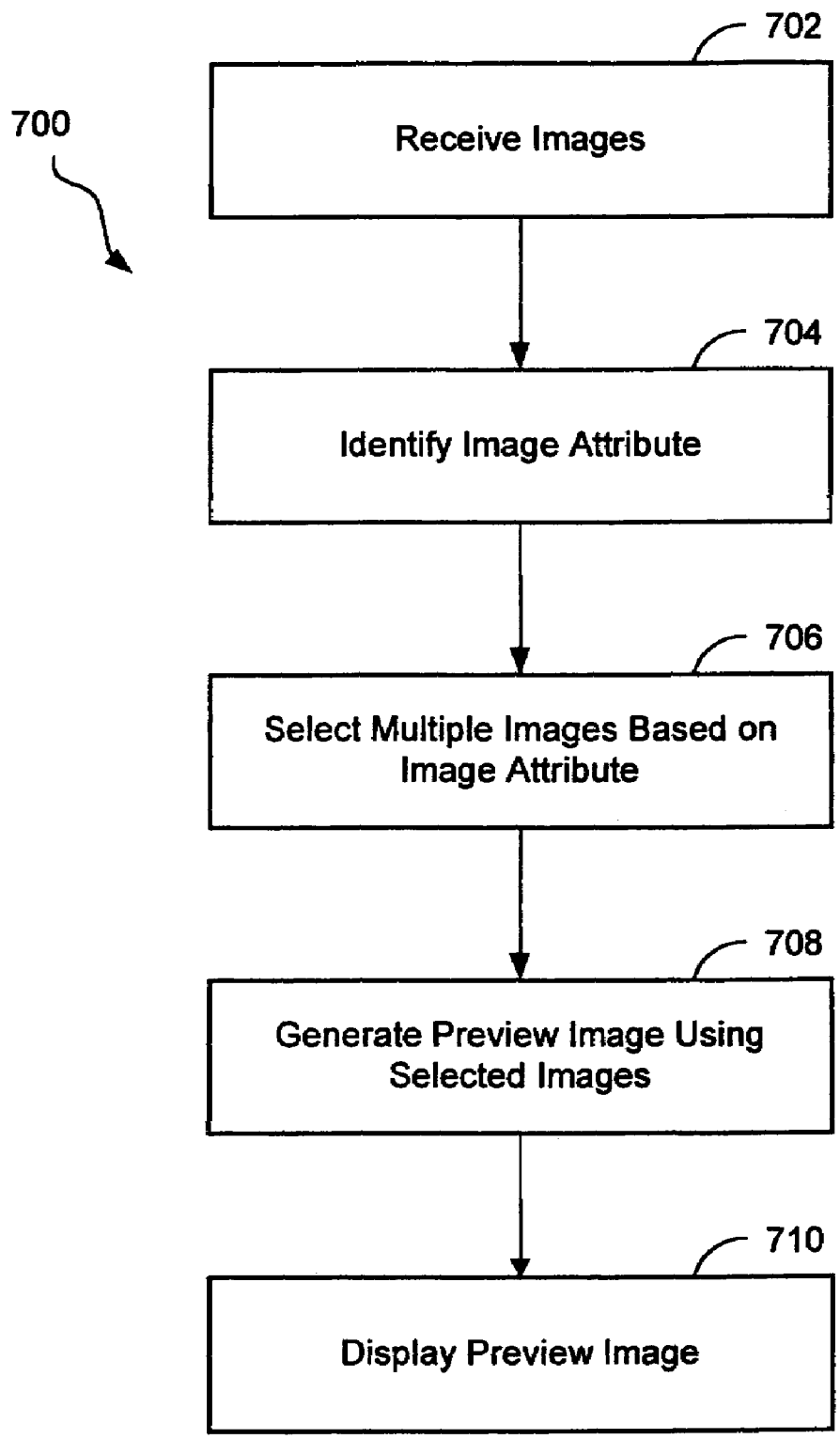
FIG. 7 is a flow diagram of a process for automatically selecting multiple images to combine in an image-based product.

In another implementation of process 400, multiple images are selected and combined in an image-based product. An image-based product containing two images is sometimes referred to as a "diptych," and an image-based product containing three images is sometimes referred to as a "triptych." FIG. 7 is a flow diagram of a process 700 for automatically selecting multiple images to combine in an image-based product (e.g., using the system 100 shown in FIG. 1). Process 700 includes receiving images from which the multiple images will be selected (block 702). For example, the images can be uploaded from a client computer 104, retrieved from the image database 114, and/or otherwise provided.

One or more attributes of the received images are identified (block 704). For example, each received image can be identified as having either a "portrait" or "landscape" orientation. An image having a portrait orientation is an image that was captured, created, and/or edited to be viewed with the longer sides of the image running in the vertical direction. On the other hand, an image having a landscape orientation is an image that was captured, created, and/or edited to be viewed with the longer sides of the image running in the horizontal direction. Also, the order in which the images were received can be identified. In addition, or instead, any other attribute of the received images can be used, including, for example, the subject matter of the images, how the images are categorized or organized by the user, whether the user has previously ordered image prints of the images, and/or colors, shapes, or patterns included in the images.

Next, multiple images are selected based on the image attributes identified for the received images (block 706). For example, two images having a portrait orientation can be selected. If there are more than two images having a portrait orientation, two images can be selected based on an additional image attribute, for example, the order in which the images were received. Alternatively, if there are more than two images having a portrait orientation, two images can be selected at random (or according to some other criterion) from those received images having a portrait orientation. Which two images are selected for such an image-based product is a product attribute of such an image-based product.

Next, a preview image is generated using the product attributes for the image-based product (block 708). For example, if two images have been selected, a preview image showing at least a portion of each of the two selected images will be generated. Then, the preview image will be displayed (block 710). The preview image, for example, can be generated by the server 102, downloaded to the client computer 104, and displayed on the client computer 104 by a browser executing on the client computer 104. As described above, the user can then make additional changes to the product attributes and/or place an order for the displayed image-based product. Such a diptych or triptych image-based product can be generated as a single image print including the selected images. Alternatively, separate image prints can be printed for each of the selected images and the image prints can be combined in an image-based product, for example, by mounting the image prints together in a frame.

Figure 8A:
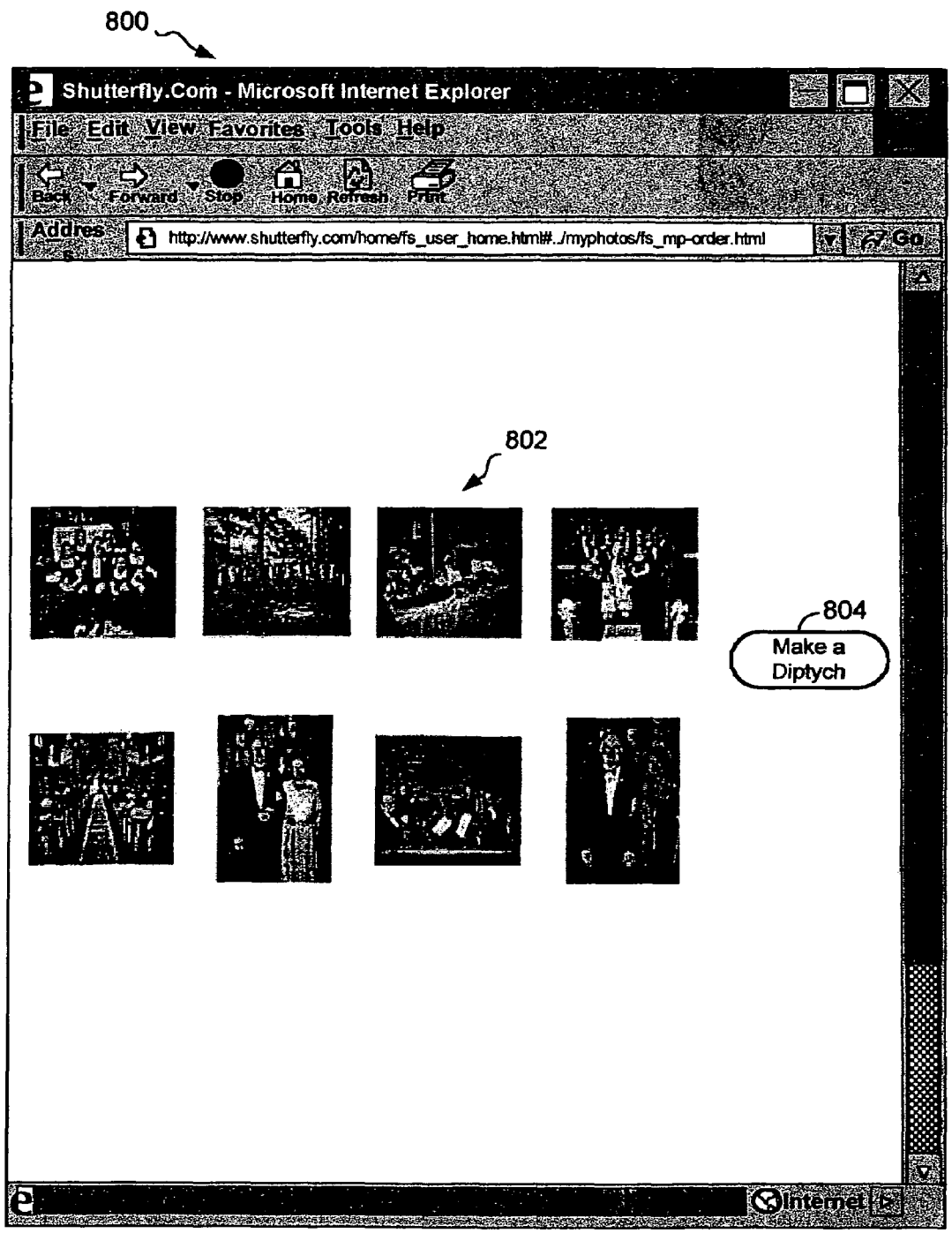
FIGS. 8A-8B show a user interface that can be used to implement the process shown in FIG. 7.
Figure 8B:
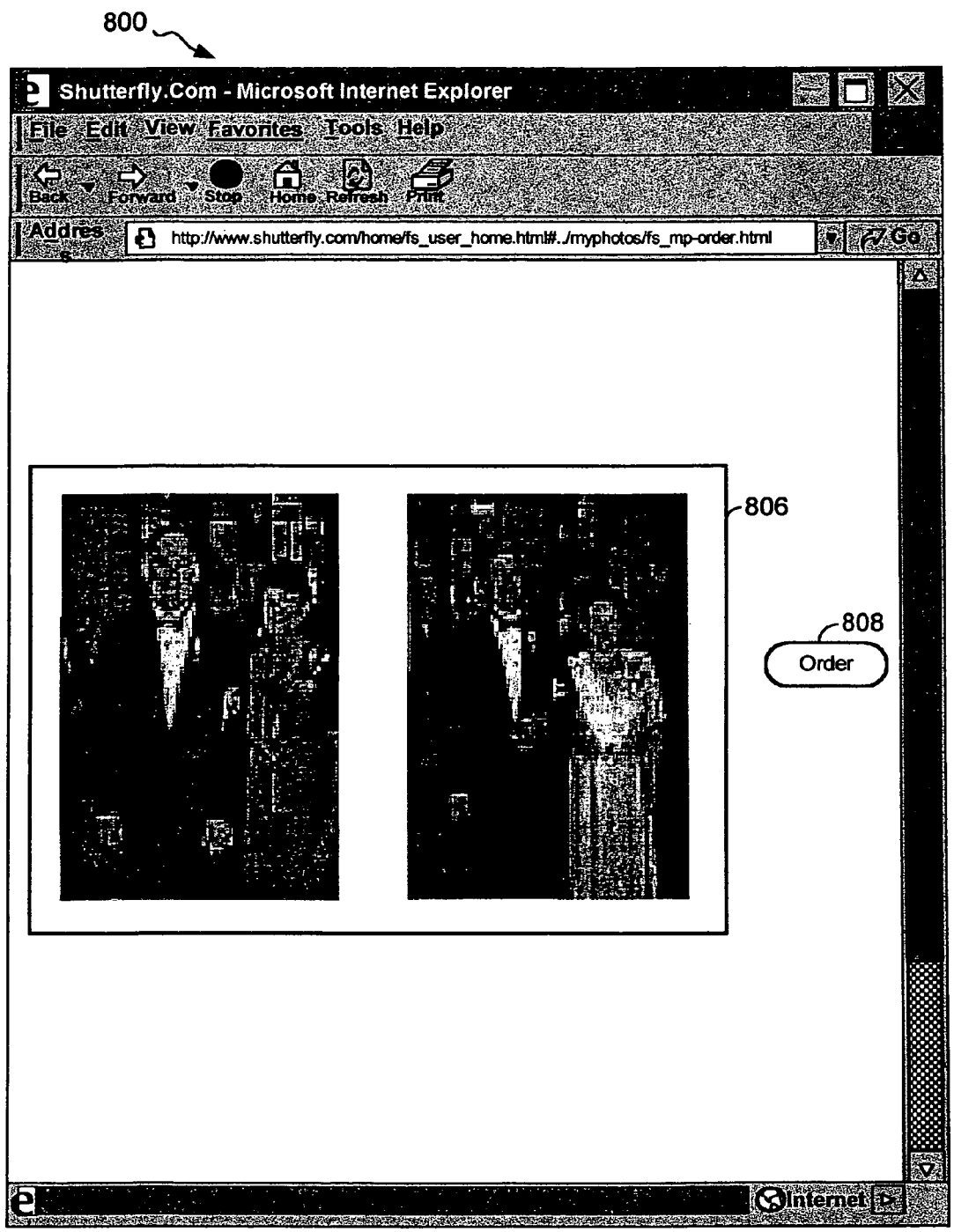

FIGS. 8A-8B show an example of a user interface 800 that can be used to implement process 700. As shown in FIG. 8A, the user interface 800 first displays received images 802. The images can be selected from the images the user has uploaded (for example, using the interface 1800). A user can have a diptych created from two images automatically selected from the received images 802 by clicking a "Make Diptych" button 804. In the implementation shown in FIGS. 8A-8B, when the user clicks the "Make Diptych" button 804 the server 102 identifies each image 802 as having either a portrait or landscape orientation. Also, the server 102 can order the images 802 according to the order in which the displayed images were received. Then, the server 102 selects two images having a portrait orientation. The server 102 generates a preview image 806 including the two selected images and, as shown in FIG. 8B, the preview image 806 is displayed in the user interface 800. The user can order the image-based product (that is, the diptych) shown in the preview image 806 by clicking an "Order" button 808. The diptych shown in the preview image 806 can be generated as a single image print including the two selected images. Alternatively, separate image prints can be printed for each of the two selected images and combined in the image-based product, for example, by mounting the image prints together in a frame.

Figure 9A:
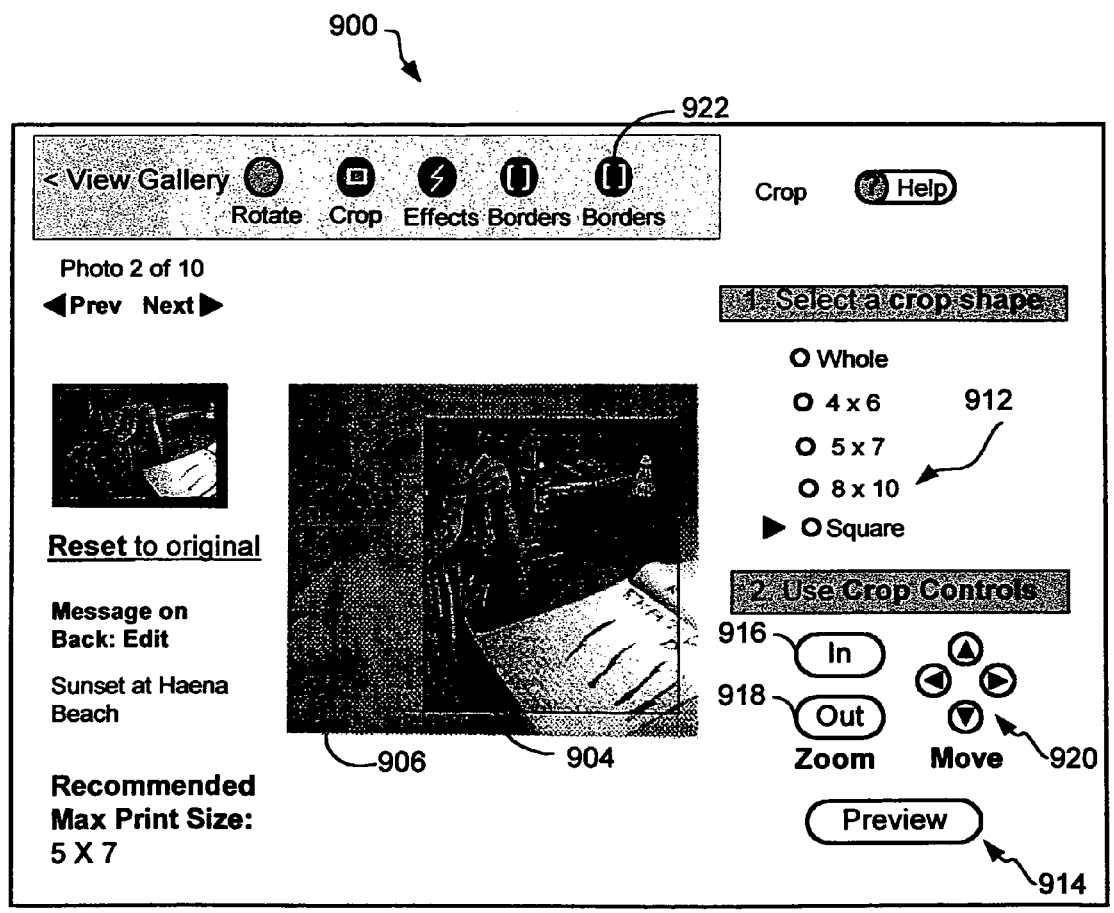
FIGS. 9A-9B show a user interface for allowing a user to specify the portion of a selected image that will be visible in an image-based product.
Figure 9B:
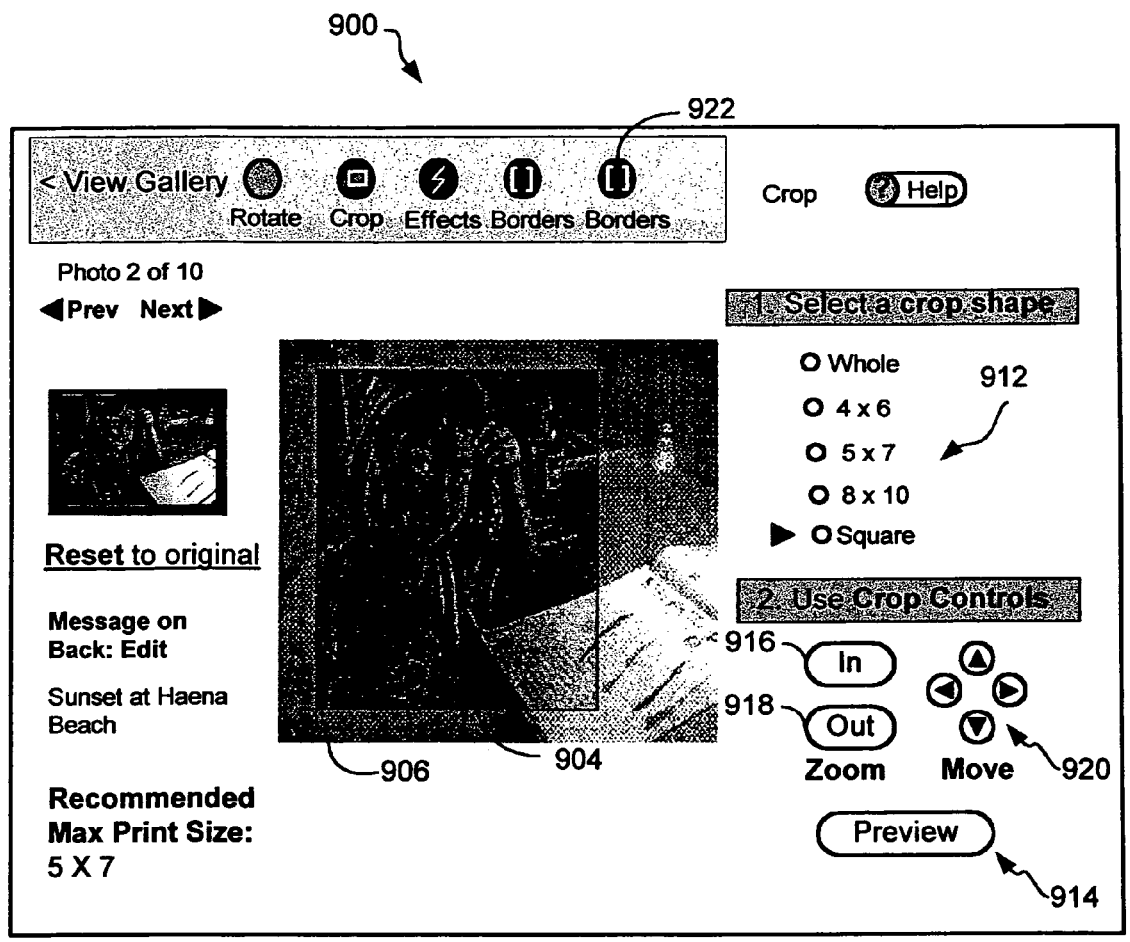
Figure 10:
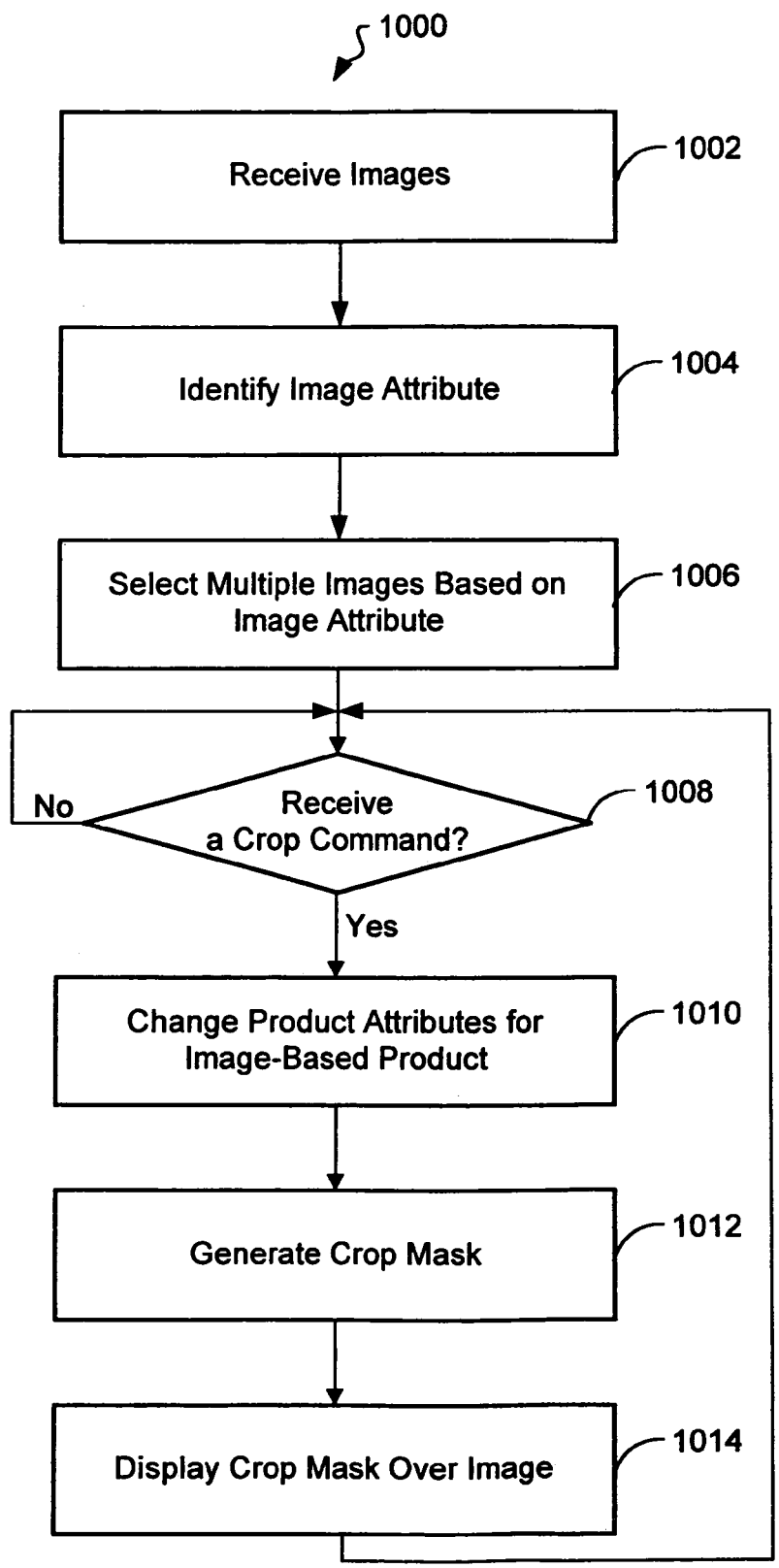
FIG. 10 is flow diagram of a process for allowing a user to crop a selected image.

As noted above, in other implementations the user can both select the product attributes to change and select new values for the selected product attributes. An example of one such implementation is shown in FIGS. 9A-9B and 10. FIGS. 9A-9B are screenshots of a user interface 900 for allowing a user to specify the portion of a selected image that will be visible in an image-based product. This operation is commonly referred to as "cropping" an image. Typically, a user crops an image by selecting a portion of the image (referred to here as the "selected" portion) that will be visible in the image-based product. Thus, an image-based product can be generated in which only the selected portion of the image is incorporated (or otherwise made visible); the rest of the image (referred to here as the "cropped" portion) is not included (or otherwise made visible) in such an image-based product incorporating the selected image. For example, a user can crop an image of a person so as to show only the person's face. In this way, an image-based product (such as an image print) can be generated showing only the person's face.

User interface 900 includes a crop display 902 for indicating which parts of the image are currently included in a selected portion 904 and a cropped portion 906 of the image. In the implementation shown in FIGS. 9A-9B, the crop display 902 is implemented as an HTML table cell having foreground and background images. The background image is a JPEG-formatted version of the selected image. The foreground image is a GIF image in which the pixels associated with the selected portion 904 are transparent and the pixels associated with the cropped portion 906 create a checkerboard pattern of alternating transparent and white (opaque) pixels. The foreground image is used as a "crop mask" that is superimposed over the background image when the HTML table cell is displayed. Only those pixels in the background image associated with a transparent pixel in the foreground image will be visible through the foreground image. As a result, all the pixels of the selected portion 904 of the background image will be visible through the foreground image, while the cropped portion 906 of the background image will appear in a checkerboard pattern.

The user interface 900 includes crop shape buttons 912 that allow the user to select the shape of the selected portion 904 by clicking on one of the crop shape buttons 912. Clicking on one of the crop shape buttons 912 both selects which product attribute to change (i.e., the product attribute relating to the shape of the selected portion 904) and the new value for the selected product attribute (i.e., the particular shape associated with the button 912 on which the user clicked). For example, the user can select a square shape for the selection portion 904 by clicking on a button representing a square. The user interface 900 also includes crop control buttons 914. The crop control buttons 914 include "In" and "Out" buttons 916 and 918 that allow the user to zoom the selected portion 904 of the image in and out, respectively. The crop control buttons 914 also include "Move" buttons 920 that allow the user to move the selected portion 904 left, right, up, or down by clicking on appropriate buttons. Clicking on one of the crop control buttons 914 both selects which product attribute to change (i.e., the size or location of the selected portion 904) and the new value for the selected product attribute (i.e., by changing the size or location as directed by the particular button on which the user clicked). For example as shown in FIGS. 9A-9B, if the user clicks on the left "Move" button 920, the selected portion 904 is moved to the left and a new foreground image 908 is generated and displayed.

After the user has finished cropping the image, the user can adjust other product attributes and/or order an image-based product incorporating the image. For example, the user can click on a "Borders" button 922 in order to view and adjust the product attributes relating to border size, style, and color, as described below.

FIG. 10 is flow diagram of a process 1000 for allowing a user to crop a selected image. Process 1000 can be implemented using the user interface 900 described above. Process 1000 includes displaying the image (block 1002). For example, as described above, the selected image can be downloaded to the client computer as a JPEG image and used as the background image of the HTML table cell.

Then a crop mask is generated (block 1004), and the crop mask is displayed over the image (block 1006). The crop mask contains a region corresponding to the selected portion of the image and a region corresponding to the cropped portion of the image. The crop mask, when displayed over the image, distinguishes the selected portion from the cropped portion of the image. For example, as described above, a crop mask can be generated as a GIF file in which the region of the crop mask corresponding to the selected portion of the image contains transparent pixels and the region of the crop mask corresponding to the cropped portion of the image contains pixels in a checkerboard pattern of alternating transparent and white (opaque) pixels. The GIF crop mask can be downloaded to the client computer 104 and used as the foreground image of the HTML table cell. The HTML table cell then can be displayed on the client computer 104 as shown in FIGS. 9A-9B. The selected portion 904 of the image is fully visible while the cropped portion 906 appears in a checkerboard pattern.

When a crop command is received (which is checked in block 1008 of FIG. 10), the product attributes related to cropping (e.g., the shape, size, and location of the selected portion 904 of the image) are changed (block 1010) and a new crop mask is generated (block 1012). For example, a user can click on a crop shape button 912 in order to change the shape of the selected portion 904 and/or click on a crop control button 914 to zoom the selected portion 904 in and out and/or to move the selected portion 904. When the user issues such a crop command, the crop command is sent to the server 102, which receives the crop command and updates the product attributes related how the image is cropped. The server 102 also generates a new GIF crop mask reflecting the new cropping-related product attributes.

The new crop mask is then displayed over the image (block 1014). Because only a relatively small crop mask image (as compared to the entire image) is generated and displayed each time the user changes how the image is cropped, such changes can be quickly displayed. For example, the new GIF crop mask can be downloaded to the client computer 104 and used as the foreground image in the HTML table cell. The HTML table cell is then displayed with the new foreground image superimposed over the background image. As noted above, after the user has finished cropping the image, the user can adjust other product attributes and/or order an image-based product incorporating the image.

Figure 11:
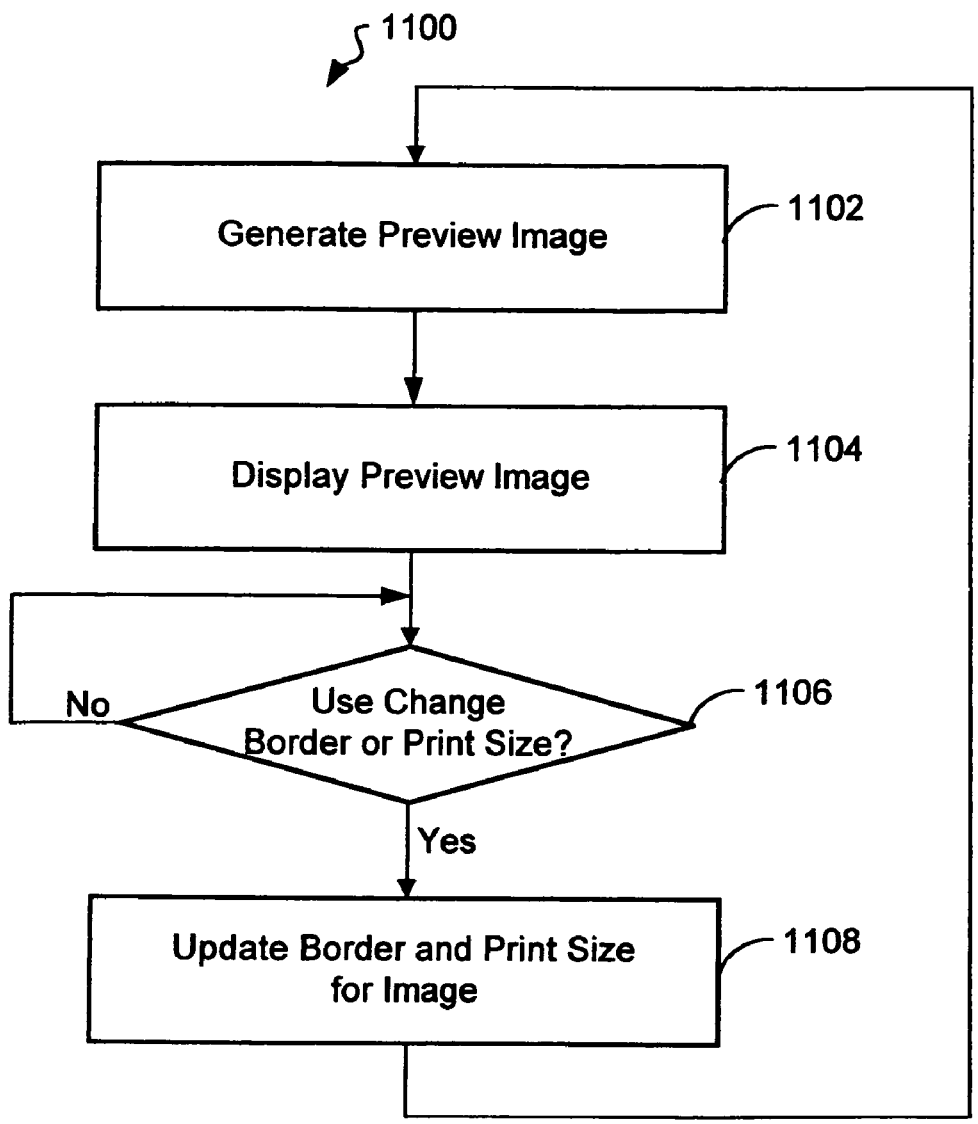
FIG. 11 is a flow diagram of a process for specifying the border size, border style, border color, and/or print size of an image print.
Figure 12A:
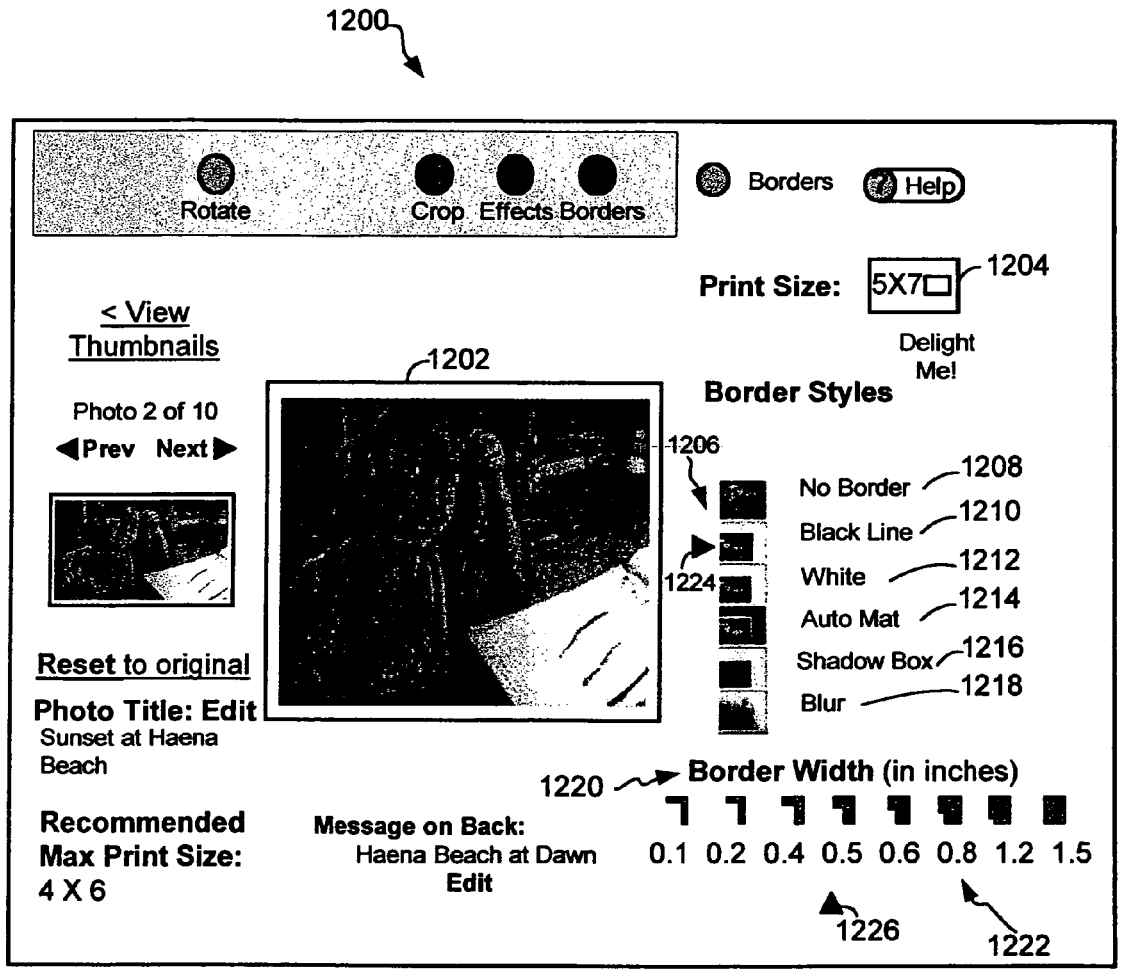
FIGS. 12A-12B show a user interface that can be used to implement the process shown in FIG. 11.
Figure 12B:
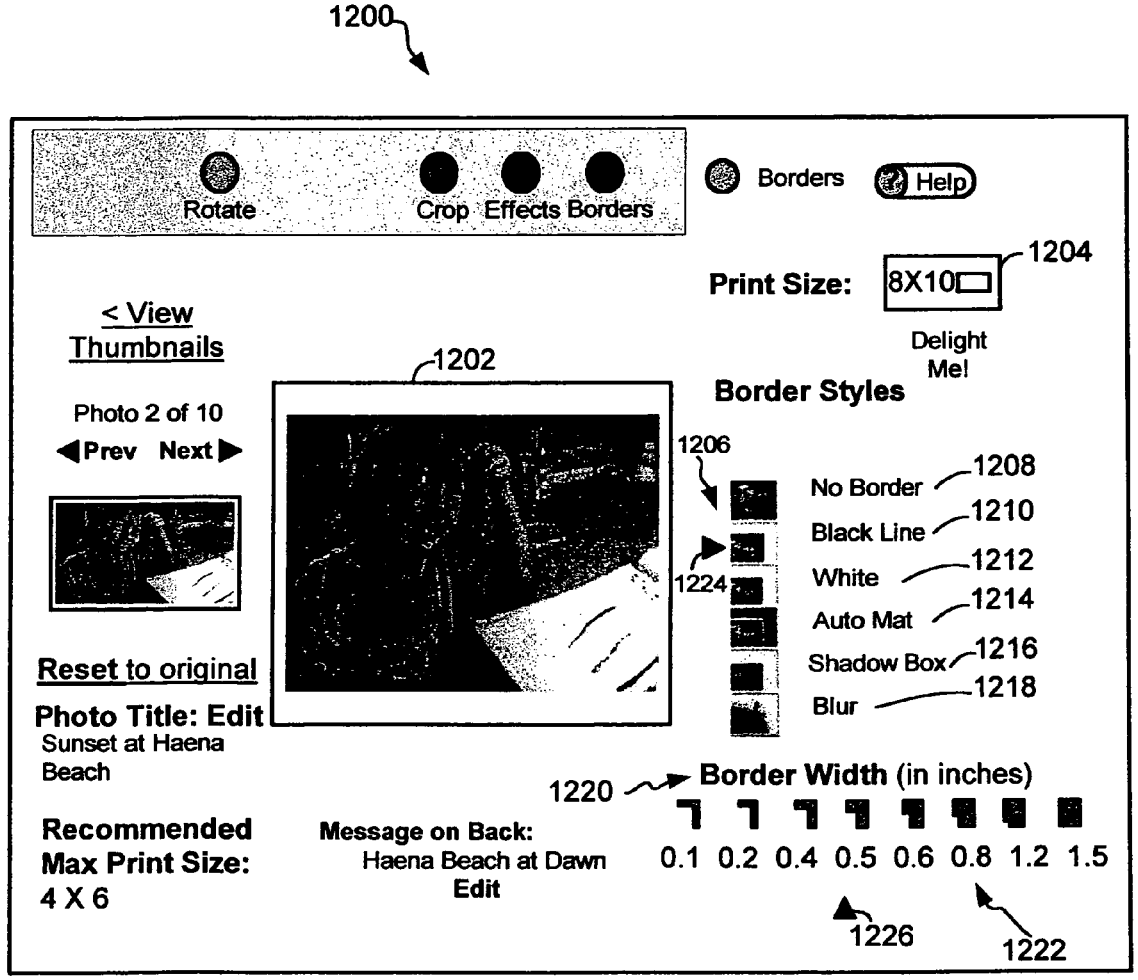

Another implementation in which the user can both select the product attributes to change and the new values for the selected product attributes is shown in FIGS. 11 and 12A-12B. In this implementation, the user can change product attributes relating to the border size, border style, border color, and print size of an image print. FIG. 11 is a flow diagram of a process 1100 of changing the border size, border style, border color, and print size of an image print. First, a preview image is generated (block 1102) using initial border size, border style, border color, and print size attributes and then displayed (block 1104). The preview image is a scaled visual representation of how the image would look printed on an image print of the specified print size with the specified border size, style and color.

The preview image is generated so as to maintain the selected image's original aspect ratio; thus, the borders along the horizontal or vertical edges of the preview image may be greater than the minimum border width specified in the product attributes. For example, the selected image can have a landscape orientation and an original aspect ratio of 1.5 (e.g., an image originally captured as a 4 inches by 6 inches image). Also, the initial product attributes for the image print can include a print size of 5 inches by 7 inches and a minimum border width of 0.4 inches. For such an image and initial product attributes, the border width along the vertical edges of the image print would need to be 0.433 inches and the border width along the horizontal edges of the image print would need to be 0.4 inches in order to maintain the selected image's original aspect ratio. Thus, the preview image would be generated and displayed to show how the image would look printed on a 5 inches by 7 inches image print having a vertical border 0.4333 inches wide and a horizontal border 0.4 inches wide.

If after viewing the preview image the user changes a product attribute (which is checked in block 1106), the product attributes are updated to reflect the changes made by the user (block 1108) and a new preview image is generated and displayed using the updated product attributes. For example, the user can change a product attribute by manipulating user interface controls such as buttons, selection boxes, and text entry fields.

After the user has finished changing the border size, border style, border color, and print size attributes, the user can adjust other product attributes and/or order an image-based product incorporating the selected image.

An example of a user interface 1200 that can be used to implement process 1100 is shown in FIGS. 12A-12B. The user interface 1200 can be implemented as one or more web pages that are downloaded from the web front end 112 to the client computer 104. The client computer 104 executes a browser in order to communicate with the web front end 112 and to display the web pages on the client computer 104. After one or more images have been uploaded from the client computer 104 and/or retrieved from the image database 114 and an image has been selected for subsequent processing, the server 102 generates a preview image 1202 using a default print size (for example, 5 inches by 7 inches as shown in FIG. 12A) and a default minimum border size (for example, 0.4 inches as shown in FIG. 12A). In addition, the server 102 generates the preview image 1202 using a default border style (for example, a border style in which a black line separates the image from the border as shown in FIG. 12A). The server 102 then downloads the preview image 1202 to the client computer 104, and the client computer 104 displays the preview image 1202 as a part of a web page implementing the user interface 1200.

The user interface 1200 includes "Print Size" selection control 1204. The user can click on the "Print Size" selection control 1204 to change the print size attribute for the image print. The user interface 1200 also includes several "Border Styles" controls 1206 that the user can click on to change the border style product attribute of the image print. The "Border Styles" controls 1206 include a "No Border" button 1208, a "Black Line" button 1210, a "White" button 1212, an "Auto Mat" button 1214, a "Shadow Box" button 1216, and a "Blur" button 1218. The user can click on the "No Border" button 1208 to change the border style attribute for the image print to indicate that the image should be displayed with no border. The user can click on the "Black Line" button 1210 to change the border style attribute for the image print to indicate that the image should be displayed with a black line separating the image from the border. The user can click on the "White" button 1212 to change the border style attribute for the image print to indicate that the image should be displayed with a white border. The user can click on the "Auto Mat" button 1214 to have the server 102 automatically select a new value for the border color attribute of the image print, for example, using the process 300 described above. The user can click on the "Shadow Box" button 1216 to change the border style attribute for the image print to indicate that the outer edge of the image portion of the image print should be darkened. The user can click on the "Blur" button 1218 to change the border style product attribute for the image print to indicate that the outer edge of the image portion of the image print should be blurred.

The user interface 1200 also includes several "Border Width" controls 1220 that the user can click on to change the border size product attribute for the image print. The "Border Width" controls 1220 include separate buttons 1222 associated with various minimum border sizes (for example, 0.1, 0.2, 0.4, 0.5, 0.6, 0.8, 1.2, and 1.5 inches as shown in FIG. 12A). The user can change the border size product attribute by clicking on the button 1222 associated with the desired minimum border size.

The user interface 1200 also includes border style and border width indicators 1224 and 1226. The border style indicator 1224 is an icon that is located next to the "Border Style" control 1206 associated with the current border style attribute for the image print. Similarly, the border width indicator 1226 is an icon that is located next to the "Border Width" button 1222 associated with the current border size attribute for the image print. In this way, the border style and border width indicators 1224 and 1226 are used to display the current border style and border size settings.

If the user clicks on the "Print Size" control 1204 or on one of the "Border Styles" controls 1206 or "Border Width Buttons 1222, the browser executing on the client computer 104 transmits the new print size, border style, or border size product attribute to the server 102. After receiving the new print size, border style, or border size product attribute, the server 102 updates the attributes maintained by server 102 for the current image-based product and generates a new preview image using the image's border size, border style, and print size attributes. The server 102 then downloads the preview image 1202 to the client computer 104, and the client computer 104 displays the preview image 1202 as a part of a web page implementing the user interface 1200. For example, if the user clicks on the "Print Size" control 1204 to change the print size from 5 inches by 7 inches to 8 inches by 10 inches, the browser executing on the client computer 104 transmits the new print size attribute to the server 102. After receiving the new print size attribute, the server 102 updates the print size attribute maintained by server 102 for the image print and generates a new preview image 1202 using the image's current border size, border style, and print size attribute. The server then downloads the preview image 1202 to the client computer 104, and the client computer 104 displays the preview image 1202 as a part of a web page implementing the user interface 1200, as shown in FIG. 12B. As noted, above, after the user has finished changing the border size, border style, border color, and print size attributes, the user can adjust other product attributes and/or order an image-based product incorporating the selected image.

Figure 13:
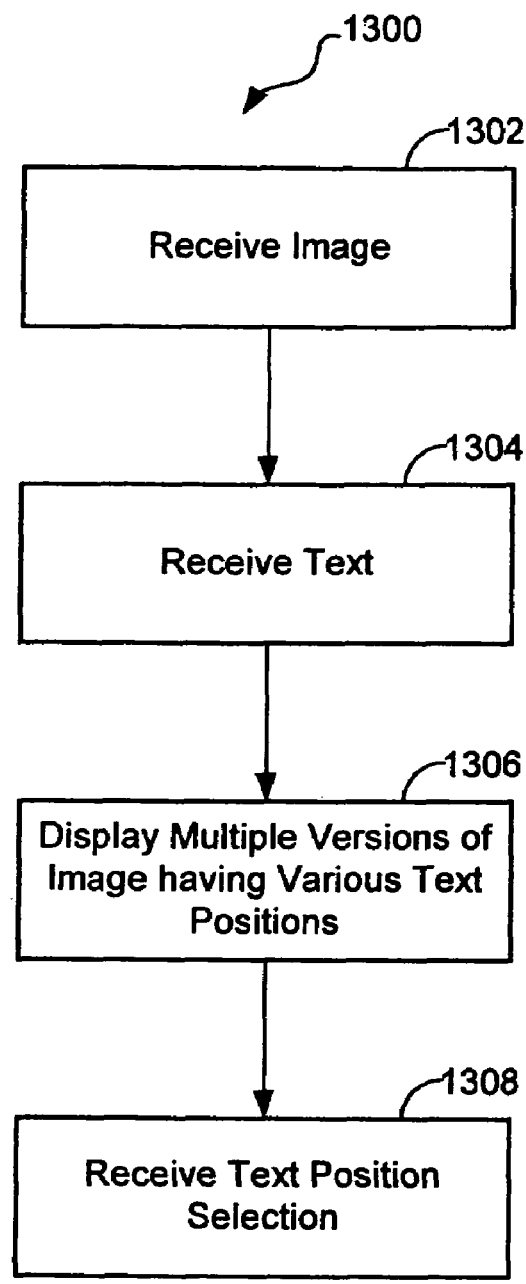
FIG. 13 is a flow diagram of a process for specifying the content and position of text to be incorporated in an image-based product.

Another implementation in which the user can both select the product attributes to change and select new values for the selected attributes is shown in FIGS. 13-14 and 15A-15B. In this implementation, the user can change product attributes relating to the content and position of text to be incorporated in an image-based product. FIG. 13 is a flow diagram of a process 1300 for changing the content and position of text to be incorporated in an image-based product. Process 1300 includes receiving an image (block 1302). Also, process 1300 includes receiving text (block 1304). The text can be received from any source. For example, the text can be received from a user (e.g., by having the user enter the information) or received from a process that generates the text based on information relating to the image (e.g., information relating to the subject matter of the image or the date on which the image was created).

Figure 14:
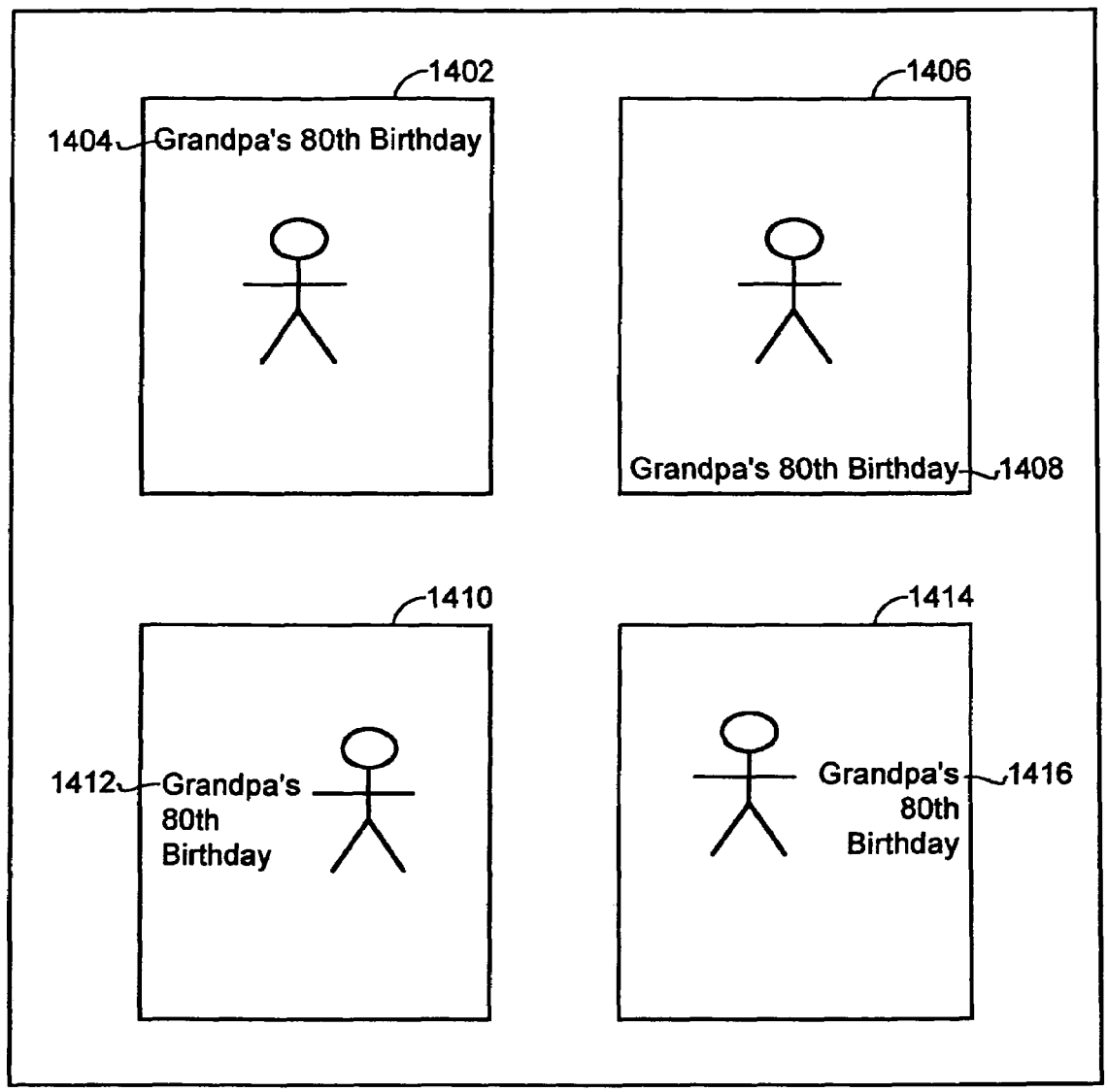
FIG. 14 shows a display of four versions of an image.

Next, multiple versions of the image are displayed showing the text positioned on the image in various locations (block 1306). For example, as shown in FIG. 14, four versions of the image can be displayed. In the first version 1402 of the image, the text 1404 is positioned near the top edge of the image. In the second version 1406 of the image, the text 1408 is positioned near the bottom edge of the image. In the third version 1410 of the image, the text 1412 is positioned near the left edge of the image, and in the fourth version 1414 of the image, the text 1416 is positioned near the right edge of the image.

Then, as shown in FIG. 13, a text position selection is received (block 1308). The text position selection indicates which text position the user has selected. Any technique for receiving a text position selection can be used. For example, a text position selection can be selected by having the user click on one of the versions of the image. The text position selection then can be used in subsequent processing to position the text on the image in the selected location. For example, an image print can be generated from the image with the text located in the selected position.

Figure 15A:
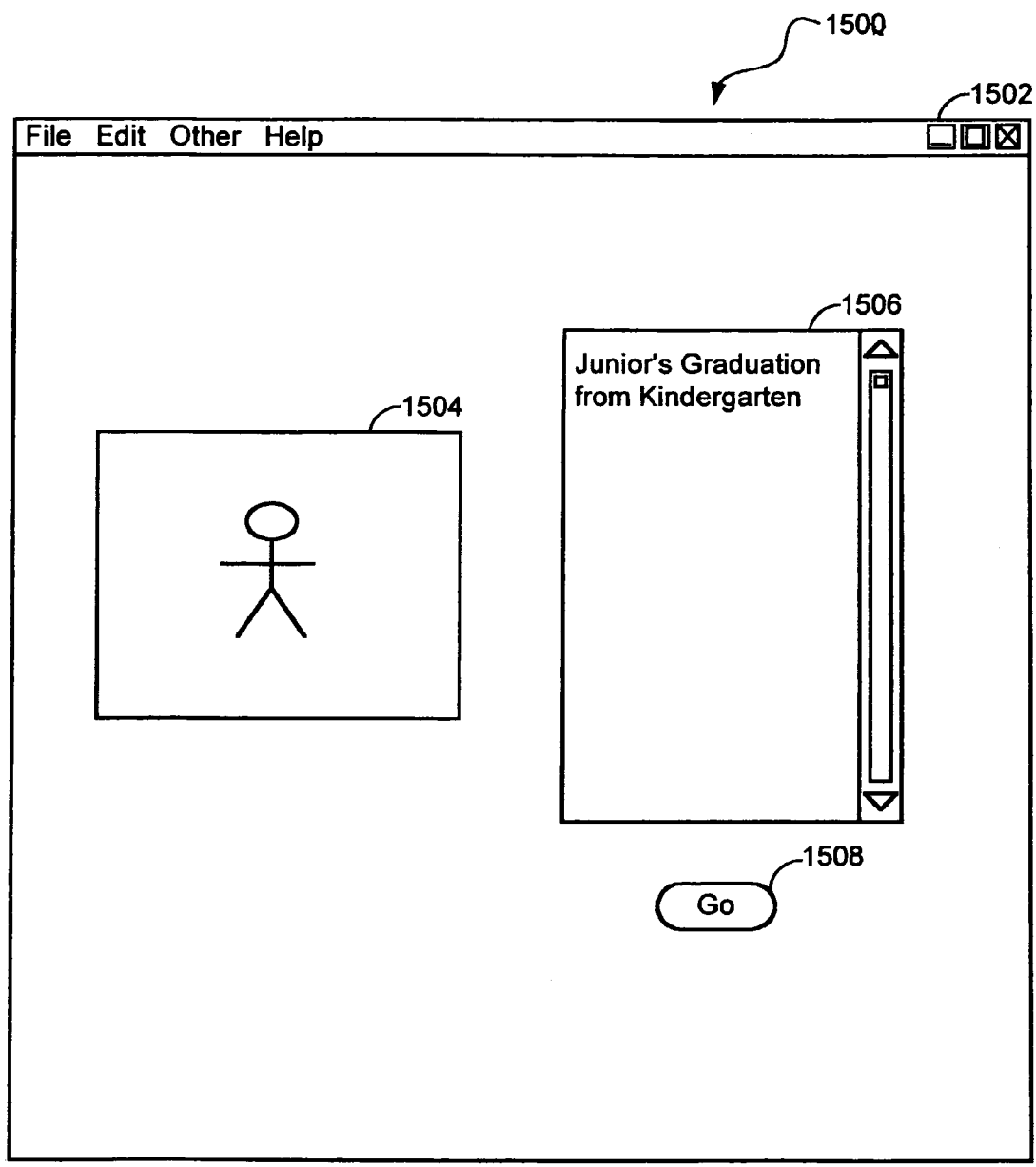
FIGS. 15A-15B show a user interface that can be used to implement the process shown in FIG. 13.
Figure 15B:
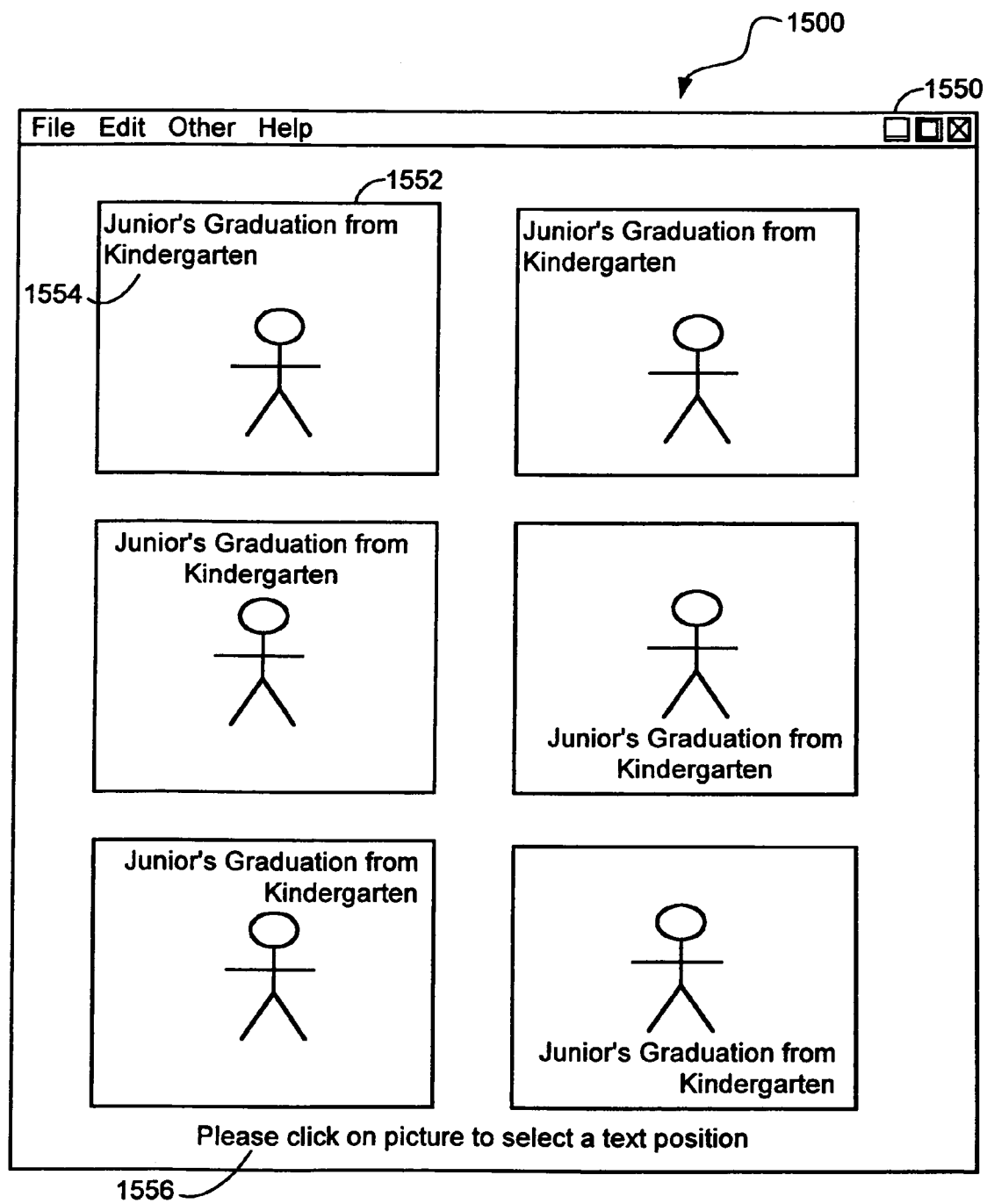

FIGS. 15A and 15B are schematic diagrams of a user interface 1500 that can be used to implement process 1300. The user interface 1500 can be implemented as one or more web pages that are downloaded from the web front end 112 to the client computer 104. The client computer 104 executes a browser in order to communicate with the web front end 112 and to display the web pages on the client computer 104. After one or more images have been uploaded from the client computer 104 and/or retrieved from the image database 114 and an image has been selected for subsequent processing, the server 102 generates and downloads to the client computer 104 a text entry web page 1502 (shown in FIG. 15A). The browser executing on the client computer 104 displays the text entry web page 1502. The text entry web page 1502 displays the selected image in an image region 1504 of the text entry web page 1502. The text entry web page 1502 also includes a text entry region 1506 in which a user can enter text. After the user has completed entering text into the text entry region 1506, the user can click on a "Go" button 1508 located on the text entry web page 1502. After the user clicks the "Go" button 1508, the text entered by the user in the text entry region 1506 is transmitted to the server 102.

After receiving the entered text from the client computer 104, the server 102 generates and downloads to the client computer 104 a position selection web page 1550 shown in FIG. 15B. The client computer 104 then receives and displays the position selection web page 1550. The position selection web page 1550 includes multiple versions of the image 1552 with the entered text located on various positions 1554 of the image. The position selection web page 1550 also includes a label 1556 instructing the user to select a text position by clicking on one of the versions 1552 of the image. When the user clicks on one of the multiple versions 1552 of the image, the client computer 104 transmits the user's text position selection to the server 102. The server 102 then update the product attributes for the image-based product so that the text position selection can be used in subsequent processing to position the text on the image-based product in the selected location. For example, an image print can be generated from the image with the text located in the selected position.

Figure 16:
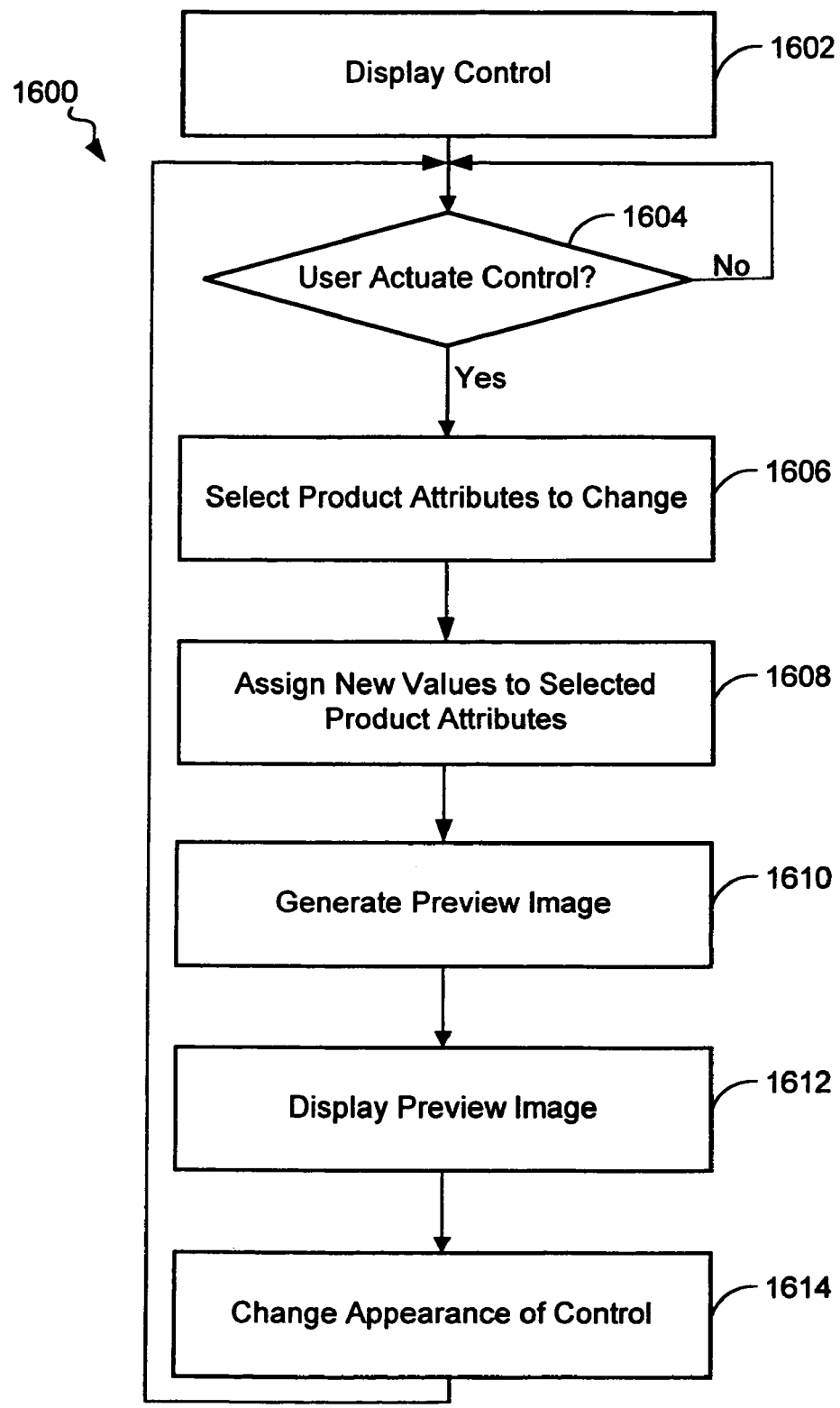
FIG. 16 is a flow diagram of a process for automatically changing the attributes of an image-based product.

As noted above, the system 100 can automatically select which product attributes to change and select new values for the selected product attributes. In one implementation shown in FIGS. 16 and 17A-17B, a user can cause the system 100 to automatically select which product attributes to change and the new values for the selected product attributes by actuating a user interface control such as a button. FIG. 16 is a flow diagram of process of causing a system 100 to automatically select which product attributes to change and the new values for the selected product attributes. First, a user interface control is displayed (block 1602). The user interface control can be any user interface element by which a user can initiate a command. Examples include a button, menu, menu item, command line, key sequence, selection box, and icon.

When the user actuates the control (which is checked in block 1604), the system 100 automatically selects which product attributes to change (block 1606) and automatically selects the new values for the selected product attributes (block 1608). For example, a user can actuate a control by manipulating a mouse attached to the client computer 104 in order to click on a button, which causes the client computer 104 to send a command to the server 102. After receiving the command, the server 102 can select the one or more product attributes to change at random and then randomly select new values for the selected product attributes. In addition, or instead, the server 102 can select one or more of the product attributes to change based on information relating to the user's images, past transactions, and account information. For example, the server 102 can select one or more product attributes that the user's account information indicates the user has not tried changing (perhaps, because the user was unaware that the particular attribute could be changed). Also, the server 102 can select new values for the selected products using information relating to the user's images, past transactions, and account information.

After the system 100 has automatically selected one or more product attributes to change and has selected new values for the selected product attributes, a new preview image is generated (block 1610) and displayed (block 1612). Preferably, the preview image is displayed in a manner that allows the user to see what changes were made to the product attributes of the image-based product. By showing the changes that were made to the product attributes of the image-based product, the user can "reverse engineer" the changes made by the system 100 in order to learn how to achieve the effect shown in the preview image and/or to undo or modify the changes made by the system 100.

Also, the appearance of the control is changed (block 1614). The appearance of the control is changed in order to indicate to the user that, by actuating the control again, the system will change the one or more product attributes of the image-based product in a different way. If the appearance of the control is not changed after the user actuates the control, it is possible that the user would believe that actuating the control another time will not result in any new changes to the product attributes. The appearance of the control can be changed, for example, by changing the size, shape, color, and location of the control, the type of control used, and/or any label, picture, or icon associated with the control. Optionally, an "undo" function can be provided so that the user can undo any changes that were made by the process 1600 and restore the selected product attributes to the values they had prior to execution of the process 1600. Also, a "redo" function can be provided so that the user can redo changes that were previously undone.

Figure 17A:
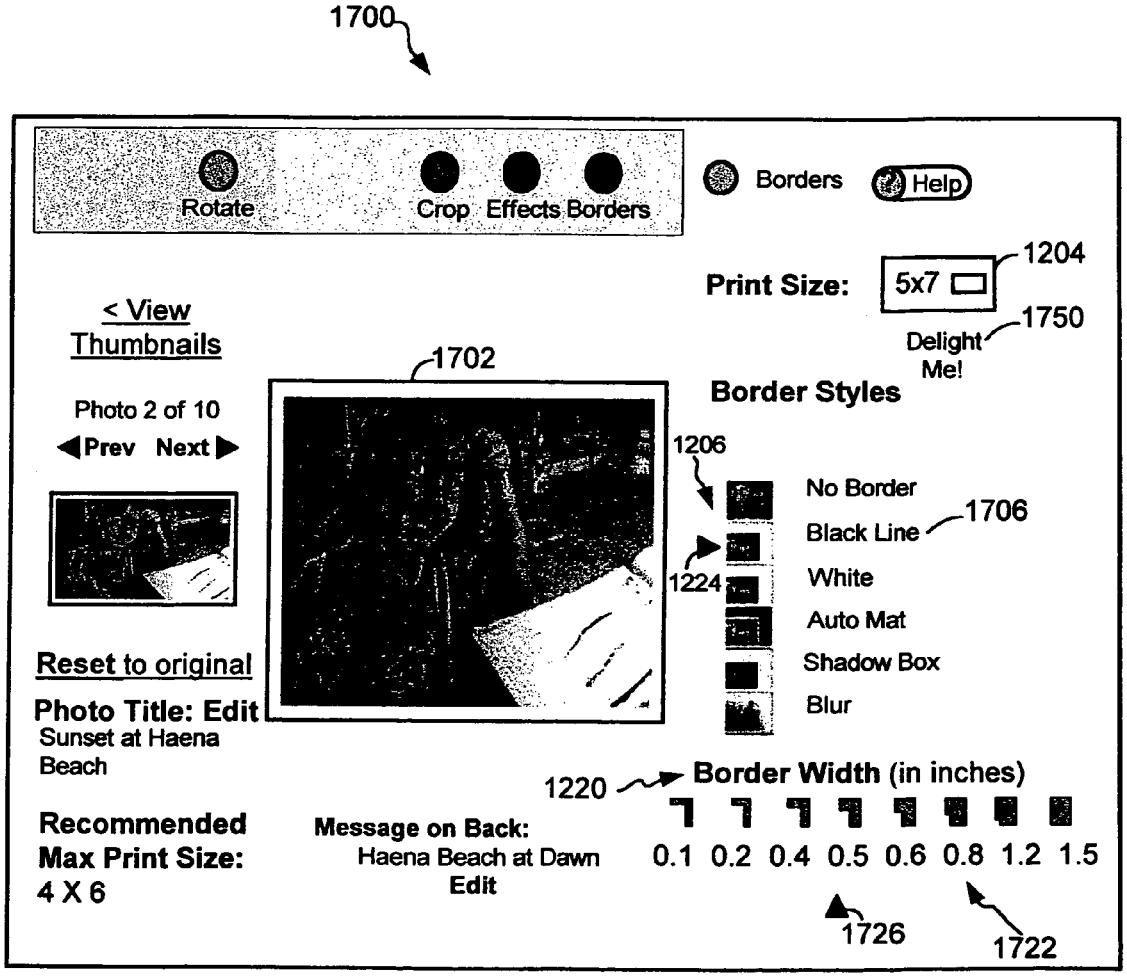
FIGS. 17A-17B show a user interface that can be used to implement process shown in FIG. 16.
Figure 17B:
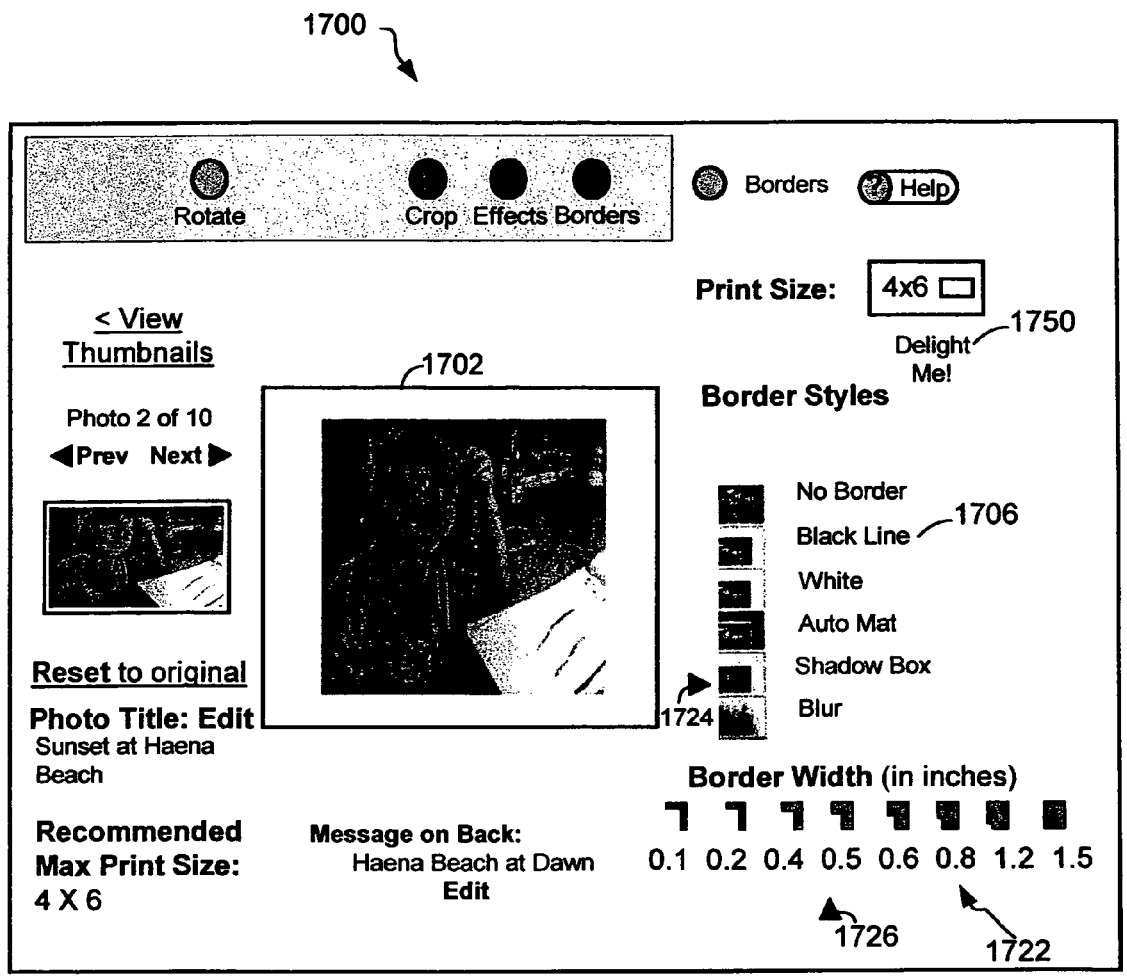

An example of a user interface 1700 that can be used to implement process 1600 is shown in FIGS. 17A-17B. The user interface 1700 is generally the same as the user interface 1200 shown in FIGS. 12-12B and includes the same elements. The user interface 1700 can be implemented as one or more web pages that are downloaded from the web front end 112 to the client computer 104. The client computer 104 executes a browser in order to communicate with the web front end 112 and to display the web pages on the client computer 104. After one or more images have been uploaded from the client computer 104 and/or retrieved from the image database 114 and an image has been selected for subsequent processing, the server 102 generates a preview image 1702 using a default print size (for example, 5 inches by 7 inches as shown in FIG. 17A) and a default minimum border size (for example, 0.4 inches as shown in FIG. 17A). In addition, the server 102 generates the preview image 1702 using a default border style (for example, a border style in which a black line separates the image from the border as shown in FIG. 17A). The server 102 then downloads the preview image 1702 to the client computer 104, and the browser executing on the client computer 104 displays the preview image 1702 as a part of a web page implementing the user interface 1700.

The user interface 1700 also includes a control. Specifically, the user interface 1700 includes a "Delight Me!" button 1750. When the user clicks on the "Delight Me!" button 1750, the server 102 selects one or more product attributes from those product attributes that can be changed using the controls displayed in FIG. 17A. For example, the server 102 can select one or more product attributes relating to border size, border style, and/or border color at random. Then, the server 102 selects new values for the selected product attributes. For example, in the example shown in FIGS. 17A-17B, when the user clicks on the "Delight Me!" button 1750, the server 102 selects at random one or more product attributes to change (e.g., the border size, border style, and print size product attributes). Then, the server 102 sets the border size print attribute to 0.5 inches, the border style to shadow box (that is, the outer edges of the image portion of the preview image 1702 are darkened), and the print size is set to 4 inches by 6 inches. Also, the appearance of the "Delight Me!" button 1750 is changed. The label associated with the "Delight Me!" button 1750 is changed to "Delight Me Again!". In addition, the server 102 generates a new preview image 1702. The server 102 then downloads to the client computer 104 the new preview image 1702 and the changed "Delight Me Again!" button 1750 as a part of web page implementing the user interface 1700. The browser executing on the client computer 104 displays the preview image 1702 and the changed "Delight Me Again!" button 1750, as shown in FIG. 17B.

The user interface 1700 also includes border style and border width indicators 1724 and 1726. The border style indicator 1724 is an icon that is located next to a "Border Style" control 1706 associated with the current border style attribute for the image. Similarly, the border width indicator 1726 is an icon that is located next to a "Border Width" button 1722 associated with the current border size product attribute for the image print. The border style and border width indicators 1724 and 1726 show the user how the border style and border size settings were changed by the server 102 as a result of clicking the "Delight Me!" button 1750.

The system 100 can be implemented so that state information for each image in the image database 114 is automatically stored on the server 102. The state information is "automatically" stored in that the user need not issue an explicit "save" command in order to store such state information on the server 102. For example, the state information for each image stored on the server 102 can include the current product attributes associated with the image. Default product attributes are initially associated with an image when the server 102 receives the image. These default product attributes are automatically stored on the server 102 as the current product attributes for that image. Then, each time the user changes the product attributes associated with that image, the stored product attributes are updated to reflect such changes.

For example, the user can use a client computer 104 to access the server 102, select an image, and then select a new border style for an image print incorporating the selected image. The server 102 generates a preview image reflecting the new product attributes, which is downloaded to, and displayed on, the client computer 104 for the user. The server 102 updates the product attributes stored on the server 102 for that image to reflect the new border style. If the user then ceases accessing that image, performs some other operation (e.g., selects and changes attributes for a second image and/or disconnects from the server 102), and then subsequently accesses the first image, the server 102 can retrieve the stored current product attributes for that image and generate a preview image using the current product attributes. Thus, even if the user subsequently accesses the first image after a substantial time period has passed (e.g., several days), the user can view a preview image reflecting the product attributes as they existed when the user last accessed the image. As a result, the user can resume whatever editing operations the user was performing when the user last accessed the image.

Figure 21:
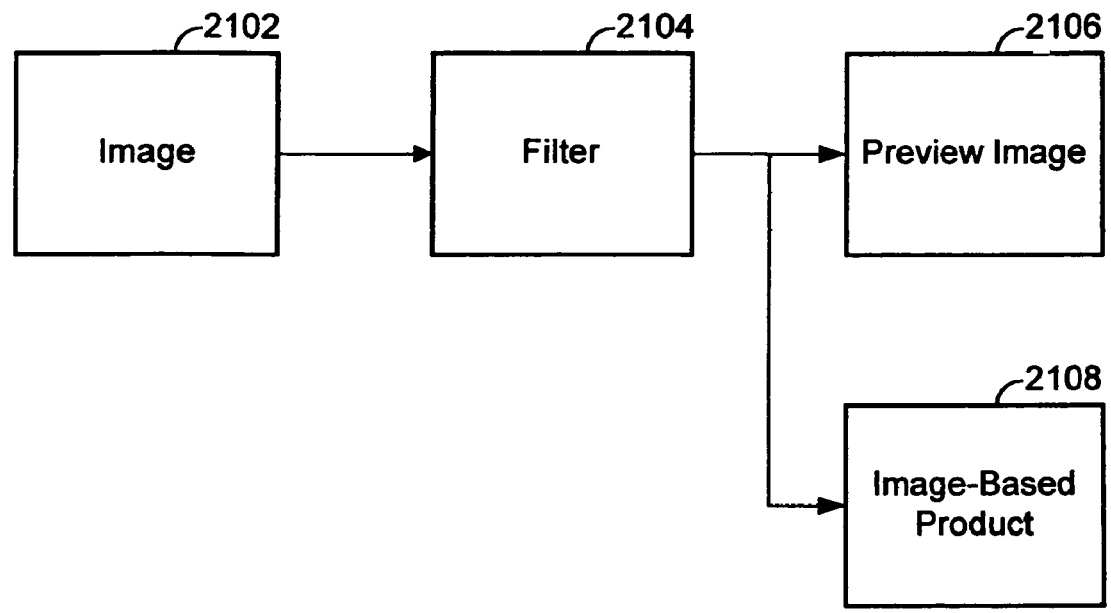
FIG. 21 is a block diagram of an approach to using current product attributes to generate a preview image and/or an image-based product.

FIG. 21 illustrates one approach to implementing such a system 100. The stored current product attributes for a given image 2102 can include product attributes relating to the rotation of the image, cropping information such as the boundary, shape, and orientation of the selected portion of the image, any processing to be applied to the image, the magnitude of such processing, and print size and orientation (e.g., where the image-based product is an image print). The stored current product attributers are used by a filter 2104 that is applied to the image 2102 in order to generate a preview image 2106. Also, the filter 2104 is applied to the image 2102 in order to generate an image-based product 2108 from the image 2102.

Figure 22:
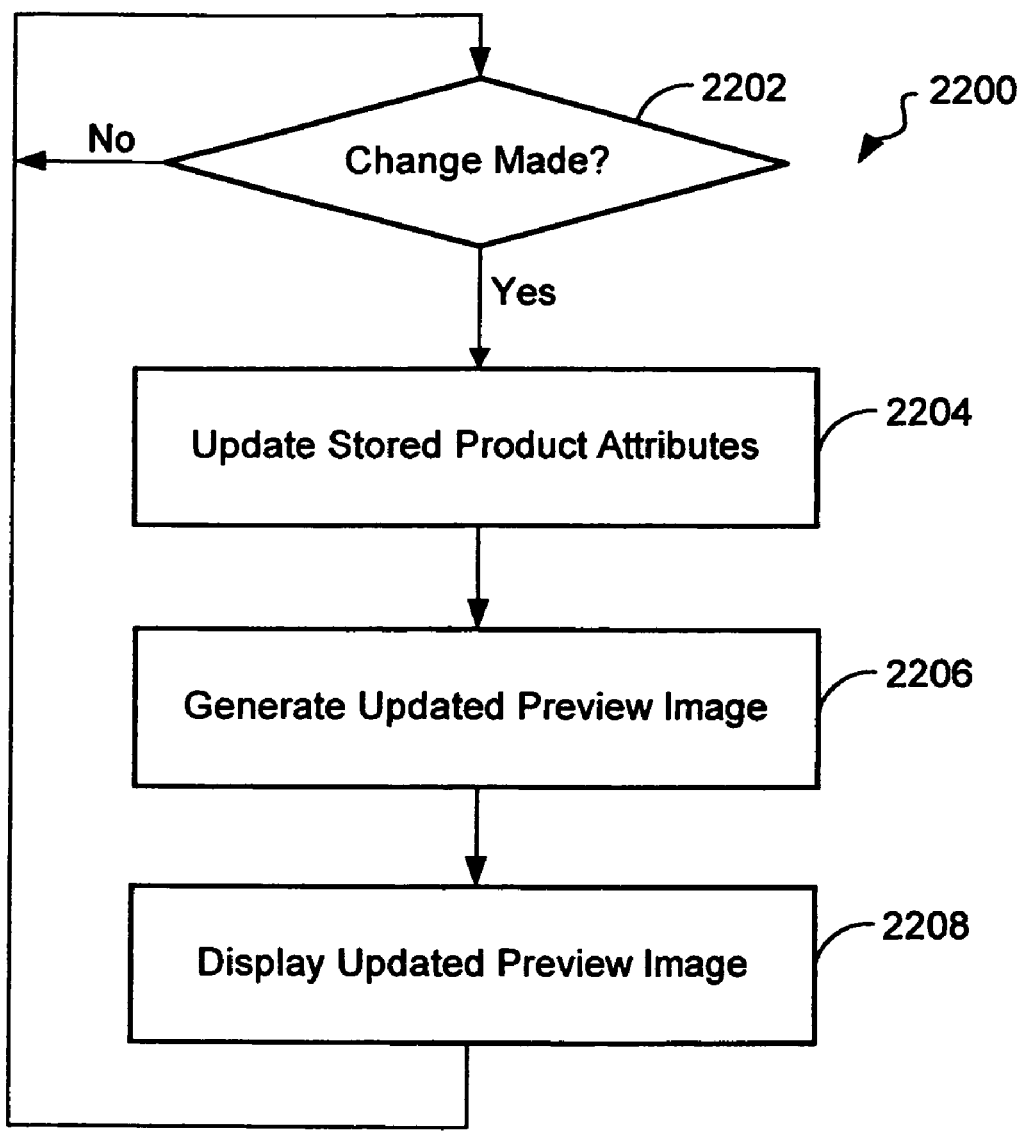
FIG. 22 is a flow diagram of a process for automatically storing state information.

FIG. 22 is a flow diagram of a process 2200 for automatically storing state information including the current product attributes associated with an image. When a change is made to a product attribute associated with an image (which is checked in block 2202), the stored product attributes for that image are updated (block 2204). For example, as described above in connection with FIGS. 5 and 6A-6B, the user can cause the server 102 to automatically select a border color for an image print. The product attributes stored on the server 102 are updated to reflect the selected border color. Then, an updated preview image is generated from the updated state information (block 2206). For example, the filter 2104 can use the updated state information to generate a preview image with a border having the selected border color. The updated preview image can then be displayed, for example, on the user's client computer 104 (block 2208).

In addition to information about the current state of product attributes associated with a given image, the state information can include information about past states of the product attributes for the image. The information about past states of the product attributes can include modification history information that can be used to "undo" changes the user has previously made to the product attributes. Also, this modification history information can be used to allow the user to "redo" any changes that have been undone. Separate modification history information is stored for each image. For example, the user can make changes to product attributes associated with a first image. Then, the user can cease accessing that image and perform some other operation—for example, accessing and changing product attributes associated with a second image and/or disconnecting from the server 102. Subsequently (e.g., several days later), the system 102 can retrieve the modification history information for that image and use that information to allow the user to undo or redo changes made when the user last accessed that image.

Figure 23:
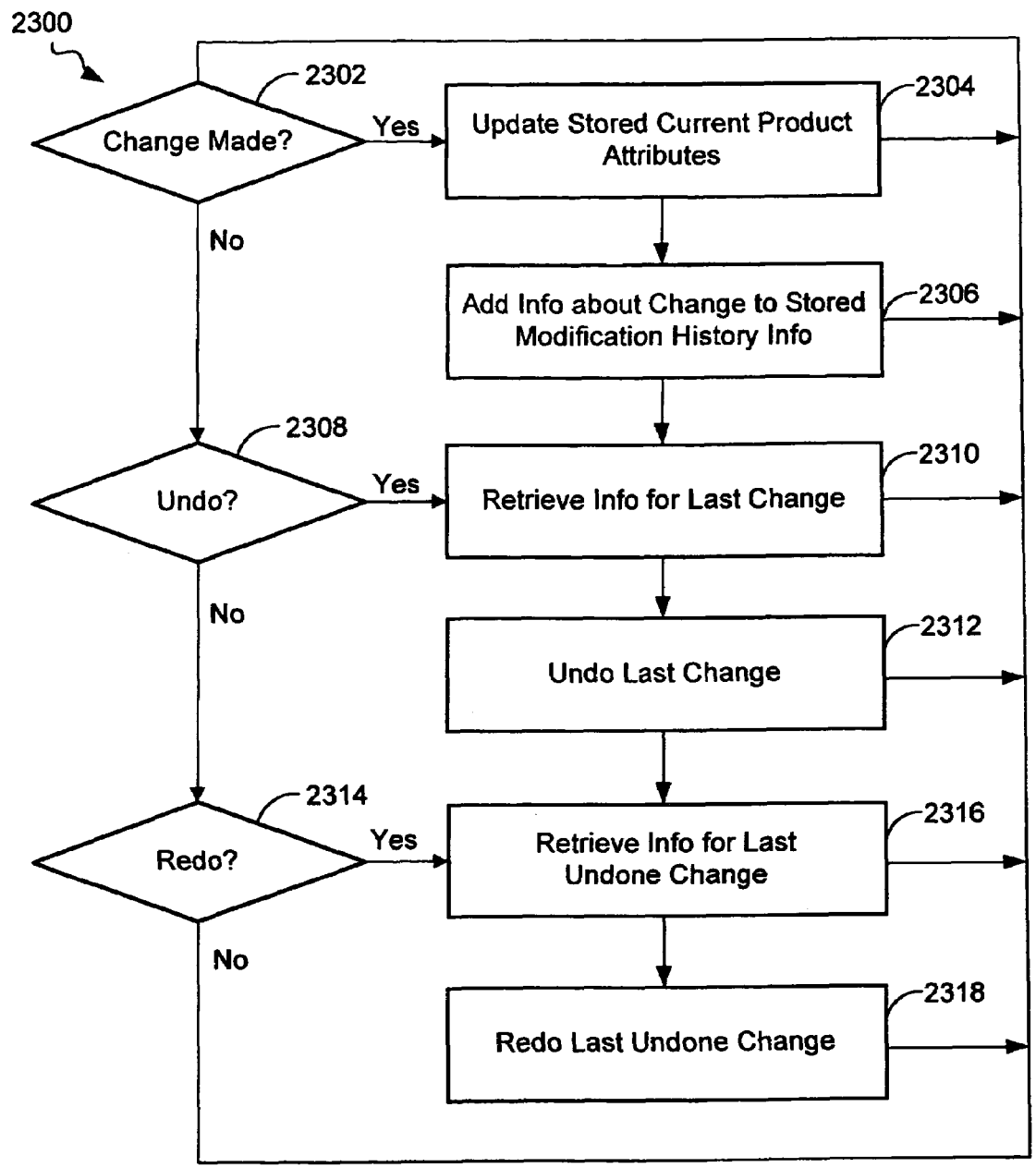
FIG. 23 is a flow diagram of a process for storing and using modification history information.
Figure 24A:
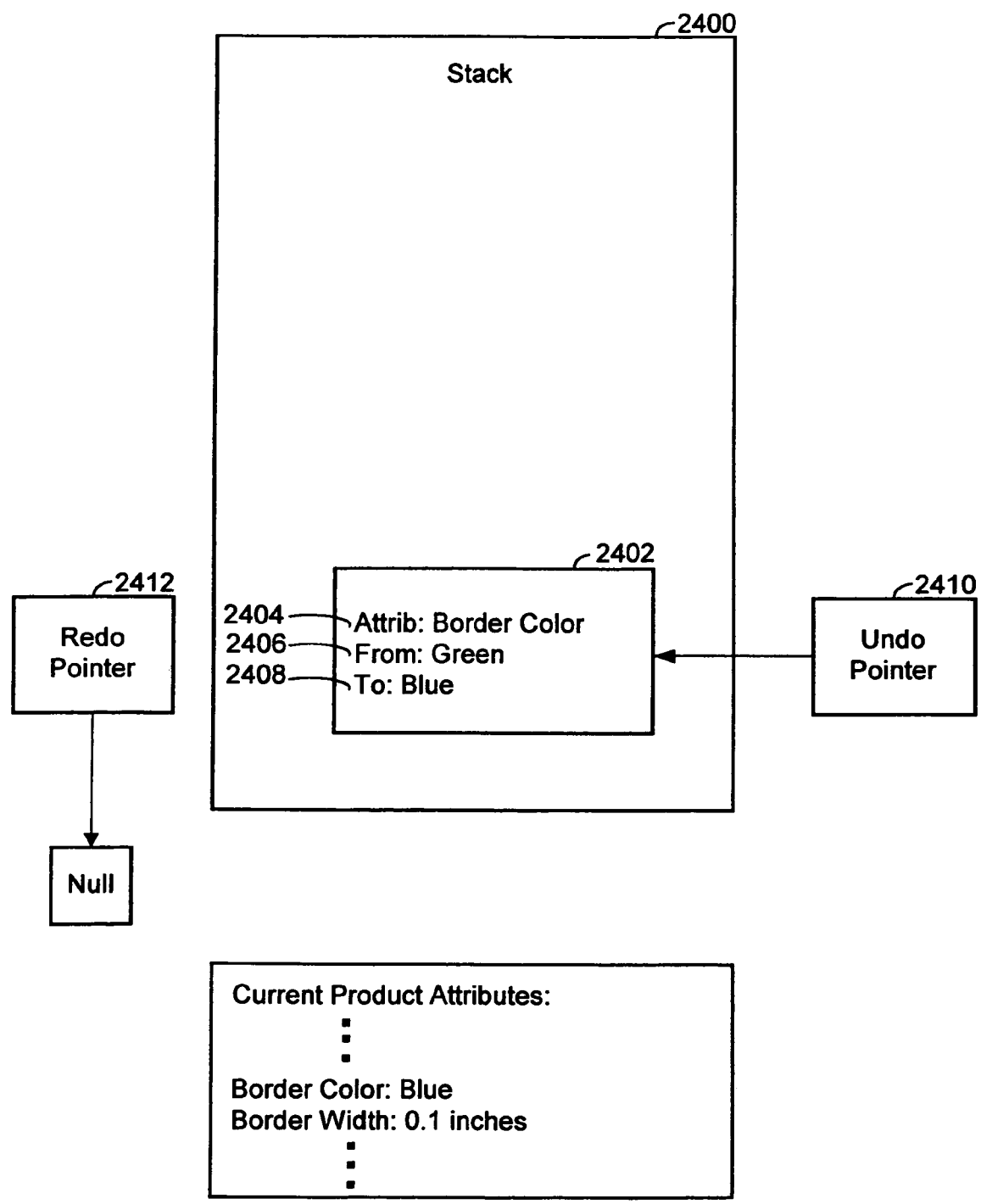
FIGS. 24A-24D are block diagrams of a stack data structure that can be used to store modification history information.

FIG. 23 is a flow diagram of a process 2300 for storing and using modification history information. For each change that is made to the product attributes of an image (which is checked in block 2302), the current stored product attributes for that image can be updated (block 2304). Also, information that can be used to undo the change is added to the modification history information for that image (block 2306). For example, as shown in FIG. 24A, the modification history information can be stored in a stack 2400 associated with the image. Each time a change is made to the product attributes of the image, a new record is created and pushed onto the stack 2400. Each record contains information indicating which product attribute was changed, the value of the product attribute before the change was made, and the value of the product attribute after the change was made. For example, if the border color associated with the image is changed from a green color to a blue color, a new record 2402 is created and pushed onto the stack 2400. The record 2402 contains information indicating that the border color attribute was changed (item 2404) and information indicating that the border color attribute was changed from a green color (item 2406) to a blue color (item 2408). The record 2402 is pointed at by an undo pointer 2410, which can be used to identify which record in the stack 2400 is associated with the last change made to the product attributes. Also, a redo pointer 2412 can be provided which points to the record associated with the last change that was undone. However, in the implementation shown in FIGS. 24A-24D, each time a new record is pushed onto the stack 2400, the redo pointer 2412 is set to null. That is, in such an implementation, the user can only issue a redo command immediately after performing one or more undo or redo commands.

Figure 24B:
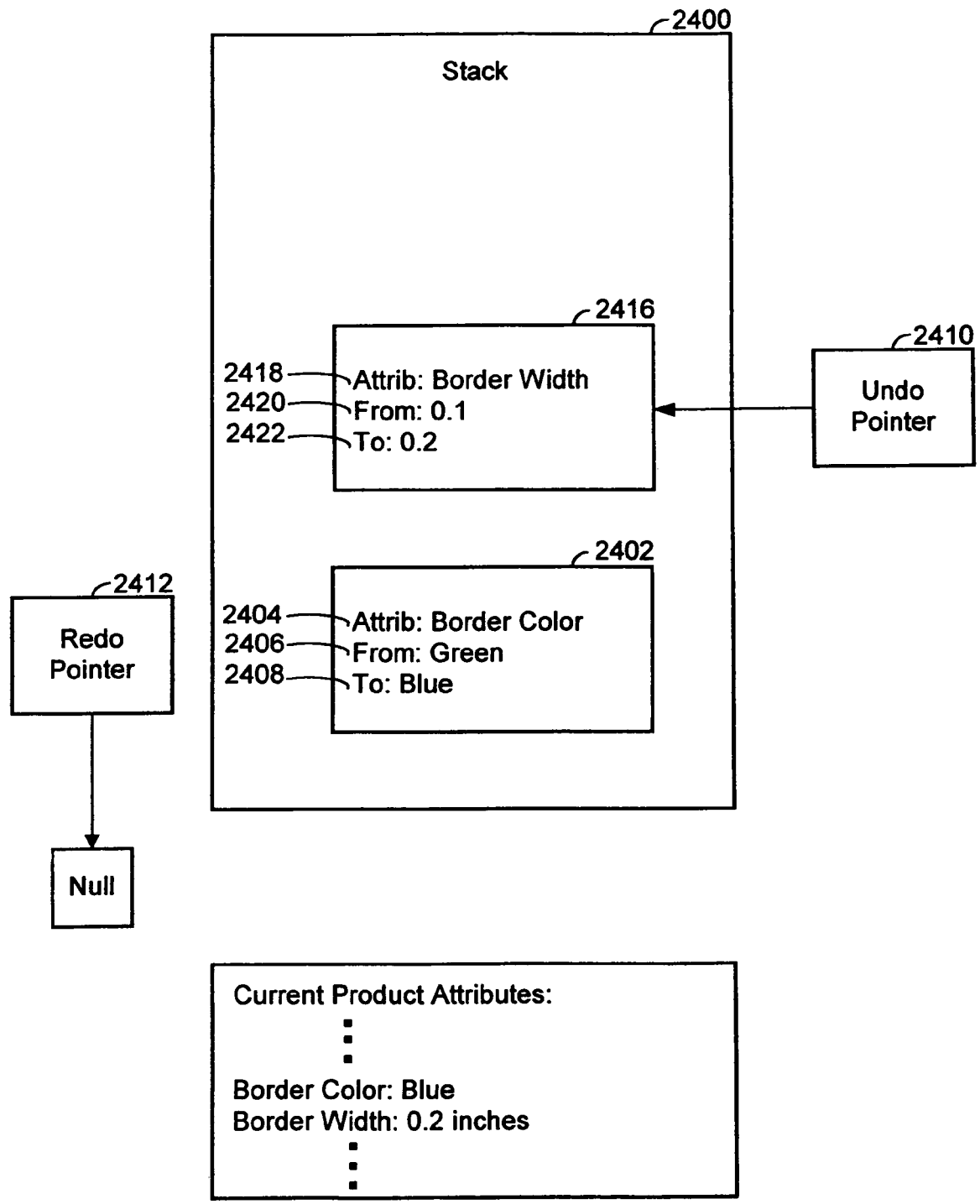

As shown in FIG. 24B, if the user subsequently makes another change to the product attributes of the image, a new record 2416 is created and pushed onto the stack 2400. For example, if the user changes the border width of the image from 0.1 inches to 0.2 inches, the record 2416 contains information indicating that the border width attribute was changed (item 2418) and information indicating that the border width attribute was changed from 0.1 inches (item 2420) to 0.2 inches (item 2422). The undo pointer 2410 is updated to point to record 2416. Because a new record was pushed onto the stack 2400, the redo pointer 2412 is set to null.

Figure 24C:
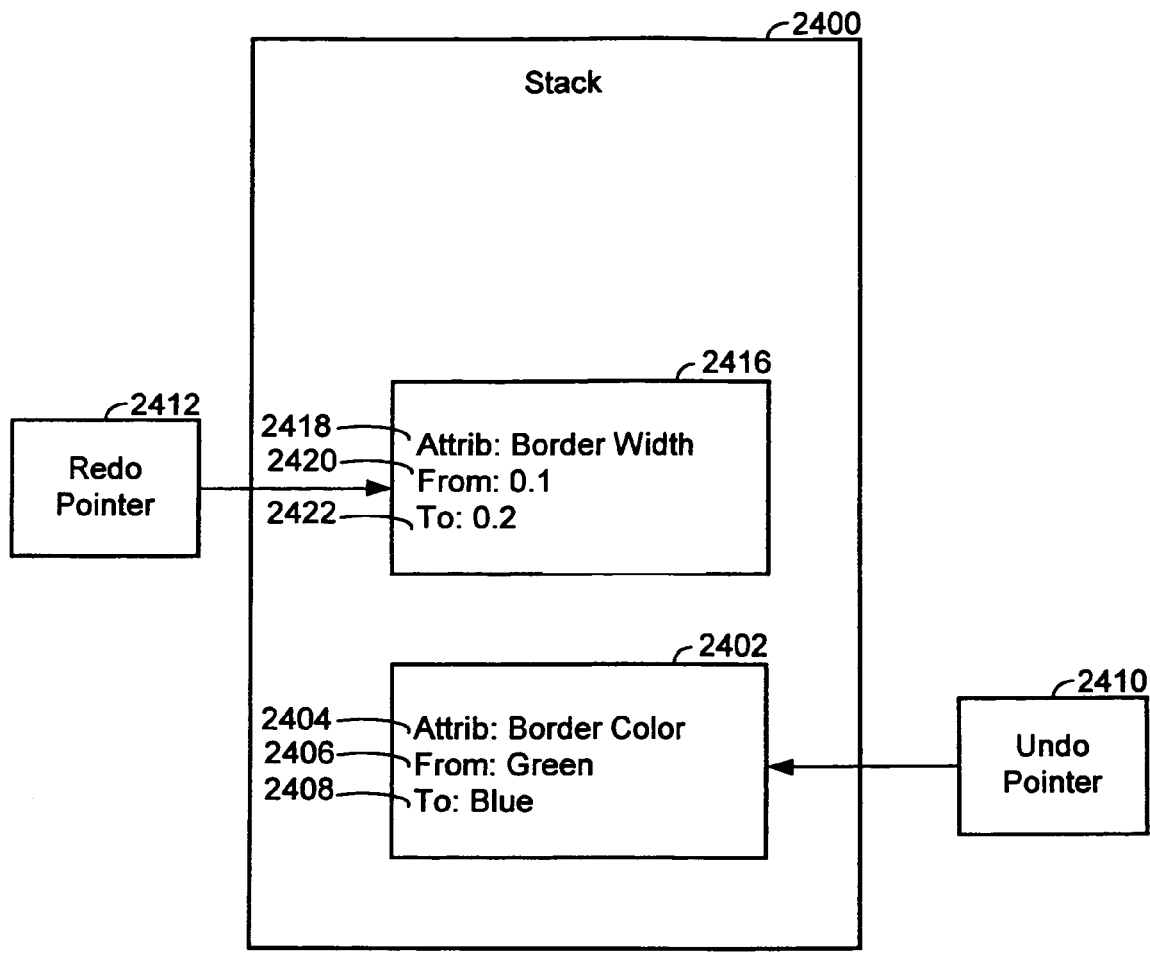
Figure 24C:
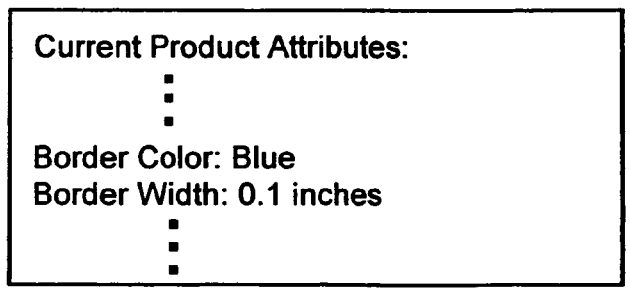

If the user subsequently issues an undo command (which is checked in block 2308 as shown in FIG. 23), the server 102 retrieves the modification history for the last change that was made to the product attributes of the image (block 2310) and the last change is undone (block 2312). For example, if the user issues an undo command (e.g., by clicking on an "undo" button displayed on the client computer 104), the server 102 retrieves the record associated with the last change made to the product attributes for the image, which is pointed to by the undo pointer 2410. As shown in FIG. 24B, the undo pointer 2410 points to the record 2416. The server 102 uses item 2418 to determine that the border width attribute was the last attribute that was changed. Then, as shown in FIG. 24C, the server 102 sets the current border width attribute for the image to the value contained in item 2420 (which contains the value of the border width attribute before the change associated with record 2416 was made). A new preview image can then be generated using the updated (undone) product attributes and displayed for the user. In the implementation shown in FIGS. 24-24D, the record 2416 is retained in the stack 2400 so as to allow the user to redo the change associated with record 2416 as described below. The undo pointer 2410 is updated to point to the record associated with the last change that was made prior to the change associated with record 2416. That is, the undo pointer 2410 is updated to point to record 2402. The redo pointer 2412 is updated to point to the record 2416 since the record 2416 is associated with the last change that was undone.

Figure 24D:
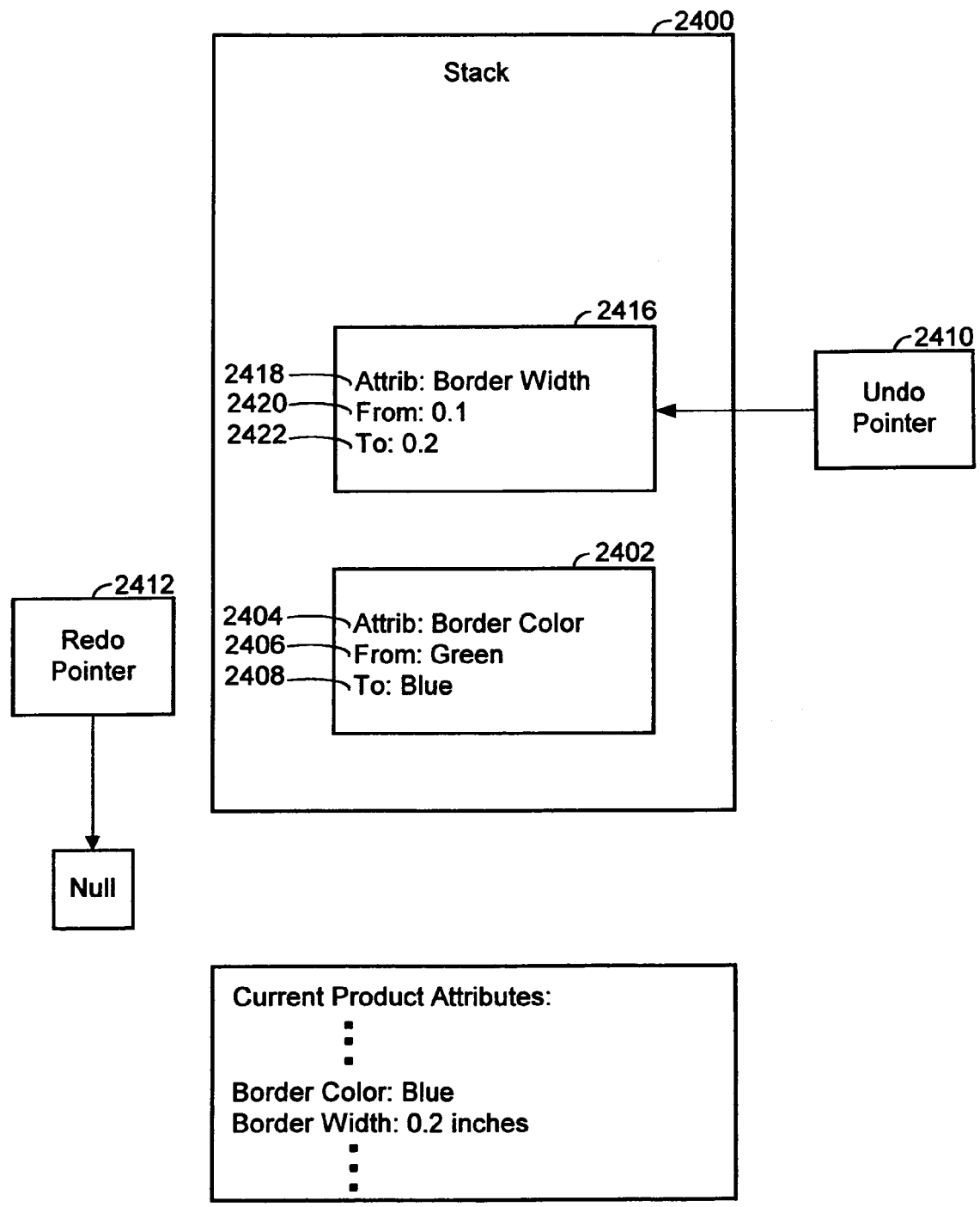

If a user issues a redo command (which is checked in block 2314 shown in FIG. 23), the modification history information for the last change that was undone is retrieved (block 2316) and that change is redone (block 2318). A change is "redone" by re-making the change that was previously undone. For example, if the user issues a redo command (e.g., by clicking on a "redo" button displayed on the client computer 104), the server 102 retrieves the record associated with the last change that was undone, which is pointed to by the redo pointer 2412. As shown in FIG. 24C, the redo pointer 2412 points to the record 2416. The server 102 uses item 2418 to determine the last change that was undone changed the border width attribute. Then, as shown in FIG. 24D, the server 102 sets the current border width attribute for the image to the value contained in item 2422 (which contains the value of the border width attribute after the change associated with record 2416 was made). A new preview image can then be generated using the updated product attributes and displayed for the user. The redo pointer 2412 is updated to point to the record in the stack 2400 associated with the last change that was undone prior to the change associated with record 2416, if any. As shown in FIG. 24D, the redo pointer 2412 is set to null since there is no record in the stack 2400 associated with a change that was undone prior to the change associated with record 2416. The undo pointer 2410 is set to point to record 2416, since record 2416 is associated with the last change that was made to the product attributes.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

Figure 19:
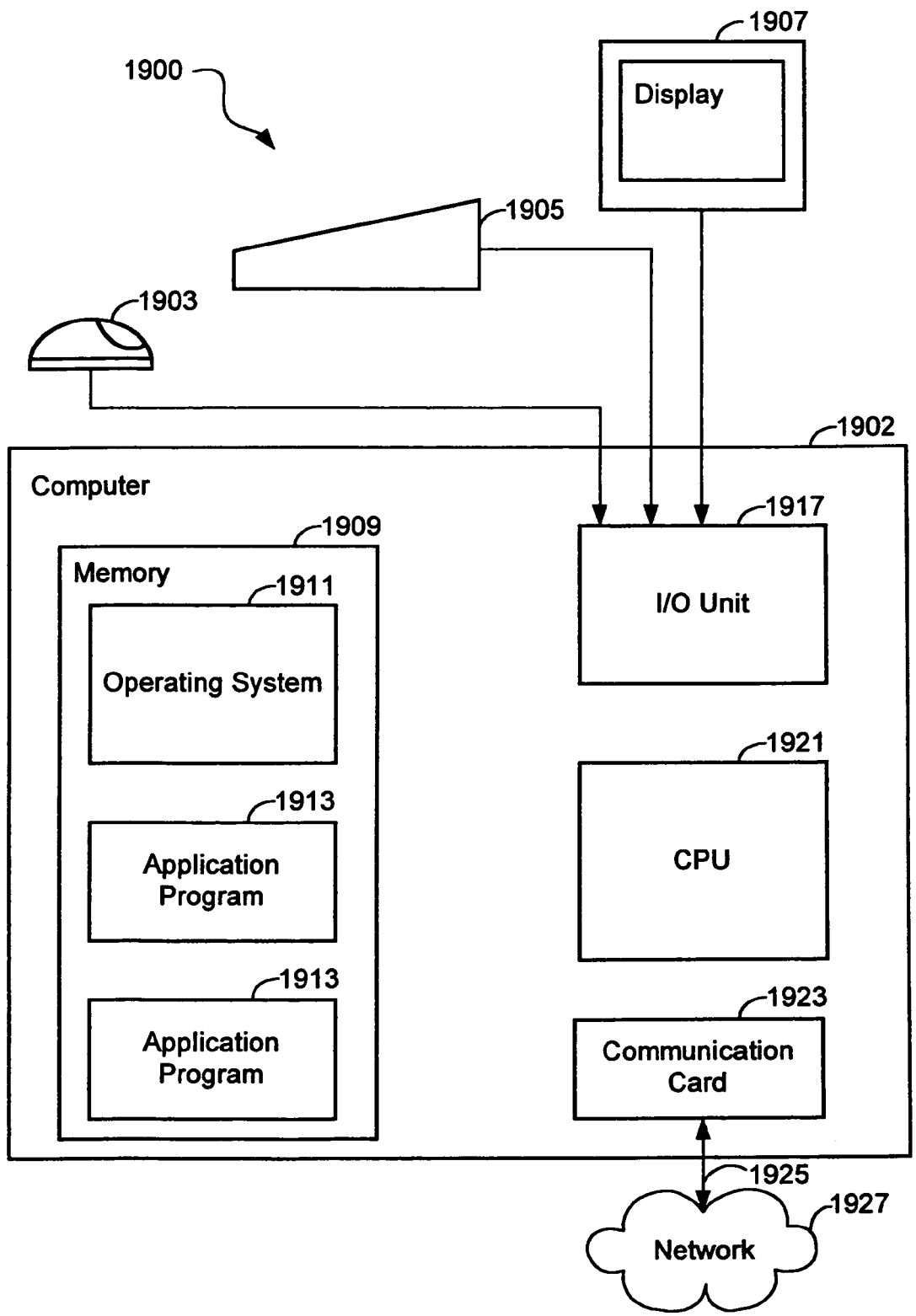
FIG. 19 is a block diagram of a computer system.

An example of one such type of computer is shown in FIG. 19, which shows a block diagram of a computer system 1900 suitable for implementing or performing the apparatus or methods of the invention. The computer system 1900 illustrated in FIG. 19 represents a typical hardware setup for executing software that allows a user to perform tasks such as communicating with other computer users, accessing various computer resources, and viewing, creating, or otherwise manipulating electronic content—that is, any combination of text, images, movies, music or other sounds, animations, 3D virtual worlds, and links to other objects. The system includes various input/output (I/O) devices (mouse 1903, keyboard 1905, and display 1907) and a general purpose computer 1902 having a central processor unit (CPU) 1921, an I/O unit 1917 and a memory 1909 that stores data and various programs such as an operating system 1911, and one or more application programs 1913. The computer system 1900 also typically includes some sort of communications card or device 1923 (e.g., a modem or network adapter) for exchanging data with a network 1927 via a communications link 1925 (e.g., a telephone line).

A number of implementations of the invention have been described. Nevertheless, it will be understood that various modifications may be made without departing from the spirit and scope of the invention. For example, the operations of the processes and methods described here can be performed in a different order and still achieve desirable results. Also, the processes, methods, and systems described here can be used to change a variety of product attributes. Accordingly, other implementations are within the scope of the following claims.

What is claimed is:

1. A system capable of visually demonstrating an image-based product to a remote user, comprising:
   a computer server;
   a web front end that connects the computer server to a computer network; and
   a computer readable medium connected to the computer server, wherein the computer software comprises instructions operable to cause the computer server to:
      receive a first digital image at the web front end from a remote computer connected to the computer network;
      receive a request from a remote user for a demonstration of an image-based product that incorporates the first digital image;
      analyze an attribute associated with the first digital image to determine one or more suitable product attributes associated with the image-based product that can be integrated with the first digital image;
      automatically select a suitable product attribute from the one or more suitable product attributes for integration with the first digital image; and
      display to the remote user a second digital image of the image-based product containing both the automatically selected suitable product attribute and the first digital image.

2. The system of claim 1, wherein the second digital image illustrates an image-based product containing the first digital image and the automatically selected suitable product attribute.

3. The system of claim 2, wherein the software further comprises instructions operable to cause the computer server to:
   download the second digital image to a client computer; and
   display the second digital image on the client computer.

4. The system of claim 3, wherein the software further comprises instructions operable to cause the web front to receive the upload of the first digital image from the remote computer to the computer server using the computer network.

5. The system of claim 1, wherein the software further comprises instructions operable to cause the web front to receive a selection of the first digital image from a plurality of images.

6. The system of claim 1, wherein the attribute associated with the first digital image includes a color attribute of the first digital image.

7. The system of claim 1, wherein the attribute associated with the first digital image includes an image border attribute of the first digital image.

8. The system of claim 1, wherein the software further comprises instructions operable to cause the computer server to:
   analyze the first digital image; and
   automatically select the suitable product attribute from the one or more suitable product attributes for integration with the first digital image based on the analysis of the first digital image.

9. The system of claim 1, wherein the software further comprises instructions operable to cause the computer server to:
   generate a set of representative colors from the first digital image; and
   analyze the attribute associated with the first digital image based on the set of representative colors generated from the first digital image.

10. The system of claim 9, wherein the software further comprises instructions operable to cause the computer server to:
    select a color as a function of at least one of the representative colors; and
    analyze the attribute associated with the first digital image based on the color selected from the set of representative colors generated from the first digital image.

11. The system of claim 10, wherein the software further comprises instructions operable to cause the computer server to select a color that matches at least one of the representative colors.

12. The system of claim 10, wherein the software further comprises instructions operable to cause the computer server to select a color that complements at least one of the representative colors.

13. The system of claim 10, wherein the software further comprises instructions operable to cause the computer server to select a color from the set of representative colors.

14. The system of claim 10, wherein the software further comprises instructions operable to cause the computer server to select the most popular color at random from the set of representative colors.

15. The system of claim 10, wherein the attribute associated with the first digital image includes the color for an image border of the first digital image.

16. The system of claim 1, wherein the software further comprises instructions operable to cause the computer server to select a suitable product attribute from a previously selected product attribute.

17. The system of claim 1, wherein the software further comprises instructions operable to cause the computer server to pseudo-randomly select a suitable product attribute from the one or more suitable product attributes.

18. The system of claim 1, wherein the software further comprises instructions operable to cause the computer server to select a suitable product attribute from the one or more suitable product attributes in a predetermined order.

19. The system of claim 10, wherein the software further comprises instructions operable to cause the computer server to select the most popular color from the set of representative colors.

20. The system of claim 10, wherein the software further comprises instructions operable to cause the server to randomly select a suitable product attribute from the one or more suitable product attributes.

21. A system capable of visually demonstrating an image-based product to a remote user, comprising:
    a computer server;
    a web front end that connects the computer server to a computer network;
    a computer readable medium connected to the computer server, wherein the computer software comprises instructions operable to cause the computer server to:
       receive a first digital image at the web front end from a remote computer connected to the computer network;
       receive a request from a remote user for a demonstration of an image-based product that incorporates the first digital image;
       analyze an attribute associated with the first digital image to determine one or more suitable product attributes associated with the image-based product that can be integrated with the first digital image;

automatically select a suitable product attribute from the one or more suitable product attributes for integration with the first digital image; and display to the remote user a second digital image of the image-based product containing both the automatically selected suitable product attribute and the first digital image; and a print lab, in communication with the computer server, that generates an image-based product based on the first image and the automatically selected product attribute.

22. A system capable of visually demonstrating an image-based product to a remote user comprising:

a computer server connected to a computer network;

a computer readable medium connected to the computer server, wherein the computer software comprises instructions operable to cause the computer server to:

receive a first digital image at the web front end from a remote computer connected to the computer network;

receive a request from a remote user for a demonstration of an image-based product that incorporates the first digital image;

analyze an attribute associated with the first digital image to determine one or more suitable product attributes associated with the image-based product that can be integrated with the first digital image;

automatically select a suitable product attribute from the one or more suitable product attributes for integration with the first digital image; and display to the remote user a second digital image of the image-based product containing both the automatically selected suitable product attribute and the first digital image; and a print lab, in communication with the computer server, that generates an image-based product based on the first image and the automatically selected product attribute.

* * * * *